United States Patent
Kimura et al.

(10) Patent No.: US 8,304,490 B2
(45) Date of Patent: Nov. 6, 2012

(54) POLYLACTIC ACID AND MANUFACTURING PROCESS THEREOF

(75) Inventors: Yoshiharu Kimura, Omihachiman (JP); Zhen Tang, Chuo-ku (JP); Kazuki Fukushima, Itami (JP); Kiyotsuna Toyohara, Iwakuni (JP); Ryuji Nonokawa, Iwakuni (JP); Yasuhito Maeda, Tokushima (JP); Masayuki Takada, Chuo-ku (JP); Yuka Komazawa, Chuo-ku (JP); Tsuyoshi Aoki, Chuo-ku (JP)

(73) Assignees: Teijin Limited, Osaka (JP); Musashino Chemical Laboratory, Ltd, Tokyo (JP); Mutual Corporation, Osaka (JP); Yoshiharu Kimura, Shiga (JP)

( * ) Notice: Subject to any disclaimer, the term of this patent is extended or adjusted under 35 U.S.C. 154(b) by 217 days.

(21) Appl. No.: 11/658,093

(22) PCT Filed: Jul. 20, 2005

(86) PCT No.: PCT/JP2005/013672
§ 371 (c)(1),
(2), (4) Date: Jan. 22, 2007

(87) PCT Pub. No.: WO2006/009285
PCT Pub. Date: Jan. 26, 2006

(65) Prior Publication Data
US 2008/0039579 A1    Feb. 14, 2008

(30) Foreign Application Priority Data

Jul. 22, 2004 (JP) ................ 2004-214496
Aug. 6, 2004 (JP) ................ 2004-230978
Aug. 31, 2004 (JP) ................ 2004-252804
Dec. 28, 2004 (JP) ................ 2004-378709

(51) Int. Cl.
*C08G 63/08* (2006.01)
*C08G 63/88* (2006.01)
*C08G 63/06* (2006.01)
*C08L 67/04* (2006.01)

(52) U.S. Cl. ........ 524/599; 525/415; 525/450; 528/272; 528/302; 528/354; 528/361

(58) Field of Classification Search ............. 524/556, 524/559, 599; 528/272, 302, 354, 361; 525/415, 525/450
See application file for complete search history.

(56) References Cited

U.S. PATENT DOCUMENTS 4,719,246 A    1/1988    Murdoch et al.
(Continued)

FOREIGN PATENT DOCUMENTS

JP    63-241024 A    10/1988
(Continued)

OTHER PUBLICATIONS

English machine translation JP 2000-017164.*
(Continued)

*Primary Examiner* — Michael Pepitone
(74) *Attorney, Agent, or Firm* — Sughrue Mion, PLLC

(57) ABSTRACT

It is an object of the present invention to provide polylactic acid containing a stereocomplex crystal and having excellent moldability, a high molecular weight, high crystallinity and a high melting point and a process for manufacturing the same. It is another object of the present invention to provide a composition comprising the polylactic acid and a molded product of the polylactic acid. The present invention is characterized from polylactic acid having a weight average molecular weight of 80,000 to 500,000 and a melting peak at 195° C. or higher which accounts for 80% or more of the total of melting peaks in the temperature elevation step when measured by a differential scanning calorimeter (DSC) and a process for manufacturing the same.

6 Claims, 3 Drawing Sheets

U.S. PATENT DOCUMENTS

| | | | |
|---|---|---|---|
| 4,766,182 A | | 8/1988 | Murdoch et al. |
| 5,317,064 A | * | 5/1994 | Spinu ............................ 525/411 |
| 6,365,173 B1 | * | 4/2002 | Domb et al. .................. 424/426 |
| 2004/0157967 A1 | * | 8/2004 | Ito ................................. 524/109 |
| 2005/0001358 A1 | * | 1/2005 | Nakazawa et al. ....... 264/331.18 |

FOREIGN PATENT DOCUMENTS

| | | | |
|---|---|---|---|
| JP | 1-225622 A | | 9/1989 |
| JP | 4-501109 A | | 2/1992 |
| JP | 2000-17163 A | | 1/2000 |
| JP | 2000-17164 A | | 1/2000 |
| JP | 2002-030208 A | | 1/2002 |
| JP | 2002-030523 A | | 1/2002 |
| JP | 2002-356543 A | | 12/2002 |
| JP | 2003-64174 A | | 3/2003 |
| JP | 2003-096285 A | | 4/2003 |
| JP | 2003-105629 A | | 4/2003 |
| JP | 2003119626 A | | 4/2003 |
| JP | 2003-128900 A | | 5/2003 |
| JP | 2003-138437 A | | 5/2003 |
| JP | 2003-183432 A | | 7/2003 |
| JP | 2003-238672 A | | 8/2003 |
| JP | 2004-26876 A | | 1/2004 |
| JP | 2004189863 A | | 7/2004 |
| WO | 90/03783 A1 | | 4/1990 |
| WO | WO 03057781 A1 | * | 7/2003 |

OTHER PUBLICATIONS

Hideto Tsuji, Suong-Hyu Hyon, and Yoshito Ikada; Stereocomplex Formation between Enantiomeric Poly(lactic acid)s. 3. Calorimetric Studies on Blend Films Cast from Dilute Solution; Macromolecules 1991, 24, 5651-5656.

Nobuhiko Yui, Pieter J. Dijkstra, Jan Feijen; Stereo block copolymers of L- and D-lactides; Makromol. Chem. 191, 481-488 (1990).

EP Communication, dated Jun. 8, 2009, issued in corresponding EP Application No. 05767665.2, 7 pages.

Polymer Preprints, Japan, vol. 52, No. 14 (2003), pp. 4176-4177.

De Jong et al., "Monodisperse Enantiomeric Lactic Acid Oligomers: Preparation, Characterization, and Stereocomplex Formation," pp. 6307-6402, vol. 31, No. 19, Macromolecules, Sep. 22, 1998.

Kasperczyk et al., Stereoselective Polymerization of Racemic DL-lactide in the Presence of Butyllithium and Butylmagnesium. Structural Investigations of the Polymers, pp. 391-395, vol. 41, Polymer, 2000.

Tsuji et al., "Crystallization Behavior of Linear 1-arm and 2-arm Poly(L-lactide)s: Effects of Coinitiators," pp. 1385-1397, vol. 49, Polymer, 2008.

Jamshidi et al., "Thermal Characterization of Polylactides," pp. 2229-2234, vol. 29, Polymer, Dec. 1988.

Lim et al., "Processing Technologies for Poly(lactic acid)," pp. 820-852, vol. 33, Progress in Polymer Science, 2008.

* cited by examiner

POLYLACTIC ACID AND MANUFACTURING PROCESS THEREOF

CROSS-REFERENCE TO RELATED APPLICATIONS

This application is a 371 National Stage Application of PCT/JP05/13672, filed on Jul. 20, 2005 and claims the benefit of Japanese Patent Application No. 2004-378709, filed Dec. 28, 2004, Japanese Patent Application No. 2004-252804, filed Aug. 31, 2004, Japanese Patent Application No. 2004-230978, filed Aug. 6, 2004, and Japanese Patent Application No. 2004-214496, filed Jul. 22, 2004.

FIELD OF THE INVENTION

The present invention relates to polylactic acid and a manufacturing process thereof. The present invention also relates to a composition comprising polylactic acid. The present invention further relates to a molded product of polylactic acid.

DESCRIPTION OF THE PRIOR ART

Biodegradable polymers which are degraded under natural environment are attracting much attention and now under study worldwide from the viewpoint of the protection of the global environment. Polyhydroxybutylate, polycaprolactone, aliphatic polyesters and polylactic acid are known as the biodegradable polymers.

As for polylactic acid out of these, lactic acid or lactide which is the raw material of the polylactic acid can be manufactured from a natural resource, and use of the polylactic acid not only as a biodegradable polymer but also as a general-purpose polymer is now under consideration.

Although polylactic acid has high transparency and toughness, it is readily hydrolyzed in the presence of water and further degraded without polluting the environment after it is scrapped. Therefore, it is a resin with a small load on environment.

Although the melting point of polylactic acid is about 170° C., when it is used as a general-purpose polymer, it is hard to say that this melting point is sufficiently high and the improvement of its heat resistance is desired.

Meanwhile, it is known that polylactic acid stereocomplex polymer is formed by mixing together poly-L-lactic acid (PLLA) consisting of an L-lactic acid unit alone and poly-D-lactic acid (PDLA) consisting of a D-lactic acid unit alone in a solution or molten state (refer to patent document 1 and non-patent document 1). It has been found that this polylactic acid stereocomplex polymer has a higher melting point and higher crystallinity than PLLA and PDLA.

However, in the manufacture of the polylactic acid stereocomplex polymer, when the molecular weights of PLLA and PDLA are 100,000 or higher, polylactic acid stereocomplex polymer is hardly obtained. Meanwhile, to obtain a molded product thereof having strength of a practical level, its molecular weight must be 100,000 or higher. Attempts are being made to form a stereocomplex from PLLA and PDLA having a molecular weight of 100,000 or higher as a solution blend. However, as it must be kept in a solution state for a long period of time, it has a problem with productivity.

There is also disclosed a process for manufacturing a stereocomplex by melting and blending a non-crystalline polymer having a molecular weight of about 200,000 and comprising 70 to 95 mol % of an L-lactic acid unit and a noncrystalline polymer having a molecular weight of about 200,000 and comprising 70 to 95 mol % of a D-lactic acid unit (refer to patent document 2). However, the melting point of the stereocomplex polylactic acid is about 194° C., leaving room for the improvement of heat resistance.

As described above, the process for manufacturing polylactic acid stereocomplex polymer having a high molecular weight from poly-L-lactic acid and poly-D-lactic acid having an optical purity of almost 100% has a problem with productivity. Meanwhile, when non-crystalline poly-L-lactic acid and non-crystalline poly-D-lactic acid having an optical purity of about 70 to 95 mol % are used, there is no problem with productivity but polylactic acid stereocomplex polymer having a high melting point cannot be obtained.

(patent document 1) JP-A 63-241024 (the term "JP-A" as used herein means an "unexamined published Japanese patent application")
(patent document 2) JP-A 2000-17163
(non-patent document 1) Macromolecules, 24, 5651 (1991)

SUMMARY OF THE INVENTION

It is an object of the present invention to provide polylactic acid which contains a stereocomplex crystal and has excellent moldability, a high molecular weight, high crystallinity and a high melting point as well as a manufacturing process thereof. It is another object of the present invention to provide a composition comprising the polylactic acid and a molded product of the polylactic acid.

The inventors of the present invention have found that polylactic acid containing a stereocomplex crystal and having a high molecular weight, high crystallinity and a high melting point can be obtained by making a specific crystalline polymer consisting essentially of an L-lactic acid unit and a specific crystalline polymer consisting essentially of a D-lactic acid unit coexistent in a specific weight ratio and heating them at a temperature higher than in the prior art. The present invention has been accomplished based on this finding.

That is, firstly, the above objects of the present invention are attained by polylactic acid having a weight average molecular weight of 80,000 to 500,000 and a melting peak at 195° C. or higher which accounts for 80% or more of the total of melting peaks in the temperature elevation step when measured by a differential scanning calorimeter (DSC).

Secondly, the above objects of the present invention are attained by a process for manufacturing polylactic acid, comprising the steps of:

(1) making a crystalline polymer (A) which is composed of 90 to 100 mol % of an L-lactic acid unit and 0 to 10 mol % of a D-lactic acid unit and/or a comonomer component unit other than lactic acid and has a melting point of 140 to 180° C. and a weight average molecular weight of 100,000 to 500,000 and a crystalline polymer (B-1) which is composed of 90 to 99 mol % of a D-lactic acid unit and 1 to 10 mol % of an L-lactic acid unit and/or a comonomer component unit other than lactic acid and has a melting point of 140 to 170° C. and a weight average molecular weight of 100,000 to 500,000 coexistent in an (A)/(B-1) weight ratio of 10/90 to 90/10, or (2) making a crystalline polymer (B) which is composed of 90 to 100 mol % of a D-lactic acid unit and 0 to 10 mol % of an L-lactic acid unit and/or a comonomer component unit other than lactic acid and has a melting point of 140 to 180° C. and a weight average molecular weight of 100,000 to 500,000 and a crystalline polymer (A-1) which is composed of 90 to 99 mol % of an L-lactic acid unit and 1 to 10 mol % of a D-lactic acid unit and/or a comonomer component unit other than lactic acid and has a melting point of 140 to 170° C. and a weight average molecular weight of 100,000 to 500,000 coexistent in an (A-1)/(B) weight ratio of 10/90 to 90/10, and
heating them at 245 to 300° C.

Thirdly, the above objects of the present invention are attained by a process for manufacturing polylactic acid having a stereocomplex crystal content of 80 to 100%, comprising the step of:

(iii) melt mixing or solution mixing
(i) a polylactic acid block copolymer (A) which is composed of an L-lactic acid block (LB) and a D-lactic acid block (DB) in a DB/LB weight ratio of 40/60 to 3/97.5 and has a weight average molecular weight of 80,000 to 300,000 and an average chain length of each block of 5 to 40 and
(ii) a polylactic acid block copolymer (B) which is composed of an L-lactic acid block (LB) and a D-lactic acid block (DB) in an LB/DB weight ratio of 40/60 to 3/97.5 and has a weight average molecular weight of 80,000 to 300,000 and an average chain length of each block of 5 to 40.

In the fourth place, the above objects of the present invention are attained by a molded product of the polylactic acid.

Further, in the fifth- place, the above objects of the present invention are attained by a composition which comprises the polylactic acid and a filler in a weight ratio of 98/2 to 1/99 and a molded product of the composition.

EFFECT OF THE INVENTION

The polylactic acid of the present invention has a high molecular weight, excellent moldability and high heat resistance. According to the manufacturing process of the present invention, the polylactic acid can be manufactured easily at a low cost. The composition comprising polylactic acid and a filler of the present invention has excellent biodegradability, mechanical strength and heat resistance. The molded product of the present invention has excellent biodegradability, mechanical strength and heat resistance.

Figure 1:
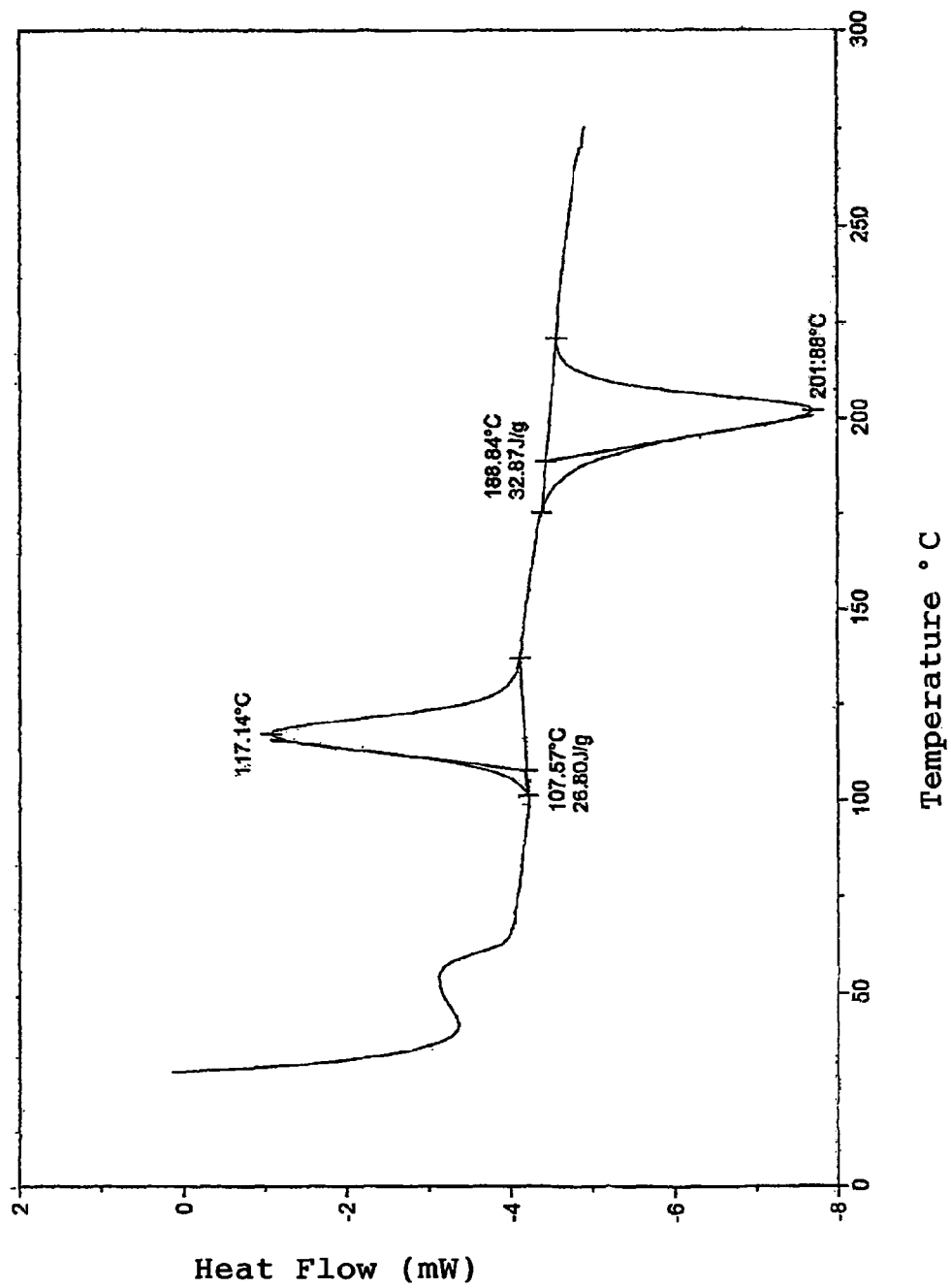
FIG. 1 is a DSC chart of the polylactic acid obtained in Example 1.

EXPLANATION OF NUMERALS 1 peak (a) (around 170.1-170.3 MHz)
2 peak (b) (around 170.0-169.8 MHz)

BEST MODE FOR THE EMBODIMENTS OF THE INVENTION

The present invention will be described in detail hereinunder.

The polylactic acid of the present invention has a weight average molecular weight of 80,000 to 500,000 and a melting peak at 195° C. or higher which accounts for 80% or more of the total of melting peaks in the temperature elevation step when measured by a differential scanning calorimeter (DSC).

The weight average molecular weigh of the polylactic acid of the present invention is preferably 100,000 to 300,000. The weight average molecular weight is a value in terms of standard polystyrene measured by gel permeation chromatography (GPC) using chloroform as an eluant.

The melting peak at 195° C. or higher of the polylactic acid of the present invention accounts for preferably 90% or more, more preferably 95% or more of the total of melting peaks in the temperature elevation step when measured by a differential scanning calorimeter (DSC).

The polylactic acid of the present invention includes polylactic acid (I) according to a first aspect and polylactic acid (II) according to a second aspect.

First Aspect

<Polylactic Acid (I)>

The polylactic acid (I) of the present invention comprises an L-lactic acid unit and a D-lactic acid unit represented by the following formula as basic components.

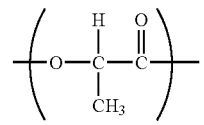

The weight average molecular weight of the polylactic acid (I) is preferably 100,000 to 500,000, more preferably 100,000 to 300,000. The weight average molecular weight is a value in terms of standard polystyrene measured by gel permeation chromatography (GPC) using chloroform as an eluant.

The melting peak at 195° C. or higher of the polylactic acid (I) accounts for 80% or more, preferably 90% or more, more preferably 95% or more of the total of melting peaks in the temperature elevation step when measured by a differential scanning calorimeter (DSC).

The melting point of the polylactic acid (I) is in the range of 195 to 250° C., preferably 200 to 220° C. The melting enthalpy of the polylactic acid (I) is 20 J/g or more, preferably 30 J/g or more. Preferably, the polylactic acid (I) has a melting peak at 195° C. or higher which accounts for 90% or more of the total of the melting peaks in the temperature elevation step when measured by a differential scanning calorimeter (DSC), a melting point of 195 to 250° C., and a melting enthalpy of 20 J/g or more.

The polylactic acid (I) comprises (1) polylactic acid units (A) and (B-1) in an (A)/(B-1) weight ratio of preferably 10/90 to 90/10. The polylactic acid (I) comprises (2) polylactic acid units (B) and (A-1) in an (A-1)/(B) weight ratio of preferably 10/90 to 90/10.

The polylactic acid unit (A) consists of 90 to 100 mol % of an L-lactic acid unit and 0 to 10 mol % of a D-lactic acid unit and/or a comonomer component unit other than lactic acid. The polylactic acid unit (A) includes a polylactic acid unit (A-1) and a polylactic acid unit (A-2). The polylactic acid unit (A-1) consists of 90 to 99 mol % of the L-lactic acid unit and 1 to 10 mol % of the D-lactic acid unit and/or the comonomer component unit other than lactic acid. The polylactic acid unit (A-2) consists of more than 99 mol % and 100 mol % or less of the L-lactic acid unit and 0 mol % or more and less than 1 mol % of the D-lactic acid unit and/or the comonomer component unit other than lactic acid.

The polylactic acid unit (B) consists of 90 to 100 mol % of a D-lactic acid unit and 0 to 10 mol % of an L-lactic acid unit and/or a comonomer component unit other than lactic acid. The polylactic acid unit (B) includes a polylactic acid unit (B-1) and a polylactic acid unit (B-2). The polylactic acid unit (B-1) consists of 90 to 99 mol % of the D-lactic acid unit and 1 to 10 mol % of the L-lactic acid unit and/or the comonomer component unit other than lactic acid. The polylactic acid unit (B-2) consists of more than 99 mol % and 100 mol % or less of the D-lactic acid unit and 0 mol % or more and less than 1 mol % of the L-lactic acid unit and/or the commoner component unit other than lactic acid.

Therefore, the polylactic acid consisting of the polylactic acid unit (A-1) and the polylactic acid unit (B-1) in a (A-1)/(B-1) weight ratio of 10/90 to 90/10 is preferred (combination 1). The (A-1)/(B-1) weight ratio is more preferably 40/60 to 60/40.

The polylactic acid consisting of the polylactic acid unit (A-2) and the polylactic acid unit (B-1) in a (A-2)/(B-1) weight ratio of 10/90 to 90/10 is preferred (combination 2). The (A-2)/(B-1) weight ratio is more preferably 40/60 to 60/40.

Further, the polylactic acid consisting of the polylactic acid unit (B-2) and the polylactic acid unit (A-1) in a (A-1)/(B-2) weight ratio of 10/90 to 90/10 is preferred (combination 3). The (A-1)/(B-2) weight ratio is more preferably 40/60 to 60/40.

The above combinations are listed below.

|  | Polylactic acid unit | amount (mol %) |
| --- | --- | --- |
| Combination 1: | A-1 | 90 ≦ [L] ≦ 99 |
|  | B-1 | 90 ≦ [D] ≦ 99 |
| Combination 2: | A-2 | 99 < [L] ≦ 100 |
|  | B-1 | 90 ≦ [D] ≦ 99 |
| Combination 3: | A-1 | 90 ≦ [L] ≦ 99 |
|  | B-2 | 99 < [D] ≦ 100 |

[L]: L-lactic acid unit
[D]: D-lactic acid unit

As described above, a combination of the polylactic acid units (A-2) and (B-2) is excluded from the composition of the polylactic acid (I).

The comonomer component unit in these polylactic acid units is selected from units derived from a dicarboxylic acid, polyhydric alcohol, hydroxycarboxylic acid and lactone having a functional group capable of forming two or more ester bonds, units derived from polyesters, polyethers and polycarbonates comprising these as constituent components, and mixtures thereof.

Examples of the dicarboxylic acid include succinic acid, adipic acid, azelaic acid, sebacic acid, terephthalic acid and isophthalic acid. Examples of the polyhydric alcohol include aliphatic polyhydric alcohols such as ethylene glycol, propylene glycol, butanediol, pentanediol, hexanediol, octanediol, glycerin, sorbitan, neopentyl glycol, diethylene glycol, triethylene glycol, polyethylene glycol and polypropylene glycol; and aromatic polyhydric alcohols such as adduct of bisphenol with ethylene oxide. Examples of the hydroxycarboxylic acid include glycolic acid and hydroxybutylcarboxylic acid. Examples of the lactone include glycollide, ε-caprolactone glycollide, ε-caprolactone, β-propiolactone, δ-butyrolactone, β- or γ-butyrolactone, pivalolactone and δ-valerolactone.

The (A)/(B) weight ratio of the polylactic acid units in the polylactic acid (I) is 90/10 to 10/90, preferably 75/25 to 25/75, more preferably 60/40 to 40/60.

<Process for Manufacturing Polylactic Acid (I)>

The polylactic acid (I) can be manufactured from crystalline polymers (A) and (B) having an L-lactic acid unit or a D-lactic acid unit represented by the following formula.

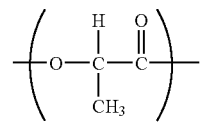

The polylactic acid (I) can be manufacturing by making a crystalline polymer (A) and a crystalline polymer (B-1) coexistent in an (A)/(B-1) weight ratio of 10/90 to 90/10 and heating them at 245 to 300° C.

The polylactic acid (I) can also be manufacturing by making a crystalline polymer (B) and a crystalline polymer (A-1) coexistent in an (A-1)/(B) weight ratio of 10/90 to 90/10 and heating them at 245 to 300° C.

The crystalline polymer (A) consists of 90 to 100 mol % of an L-lactic acid unit and 0 to 10 mol % of a D-lactic acid unit and/or a comonomer component unit other than lactic acid. The crystalline polymer (A) has a melting point of 140 to 180° C. and a weight average molecular weight of 100,000 to 500,000. The crystalline polymer (A) includes a crystalline polymer (A-1) and a crystalline polymer (A-2).

The crystalline polymer (A-1) consists of 90 to 99 mol % of the L-lactic acid unit and 1 to 10 mol % of the D-lactic acid unit and/or the comonomer component unit other than lactic acid. The crystalline polymer (A-1) has a melting point of 140 to 170° C., preferably 140 to 160° C., and a weight average molecular weight of 100,000 to 500,000, preferably 100,000 to 200,000.

The crystalline polymer (A-2) consists of more than 99 mol % and 100 mol % or less of the L-lactic acid unit and 0 mol % or more and less than 1 mol % of the D-lactic acid unit and/or the comonomer component unit other than lactic acid. The crystalline polymer (A-2) has a melting point of 160 to 180° C., preferably 165 to 176° C. and a weight average molecular weight of 100,000 to 500,000, preferably 100,000 to 300,000, more preferably 150,000 to 250,000.

The crystalline polymer (B) consists of 90 to 100 mol % of the D-lactic acid unit and 0 to 10 mol % of the L-lactic acid unit and/or the comonomer component unit other than lactic acid. The crystalline polymer (B) has a melting point of 140 to 180° C. and a weight average molecular weight of 100,000 to 500,000. The crystalline polymer (B) includes a crystalline polymer (B-1) and a crystalline polymer (B-2).

The crystalline polymer (B-1) consists of 90 to 99 mol % of the D-lactic acid unit and 1 to 10 mol % of the L-lactic acid unit and/or the comonomer component unit other than lactic acid. The crystalline polymer (B-1) has a melting point of 140 to 170° C., preferably 140 to 160° C. and a weight average molecular weight of 100,000 to 500,000, preferably 100,000 to 200,000.

The crystalline polymer (B-2) consists of more than 99 mol % and 100 mol % or less of the D-lactic acid unit and 0 mol % or more and less than 1 mol % of the L-lactic acid unit and/or the comonomer component unit other than lactic acid. The crystalline polymer (B-2) has a melting point of 160 to 180° C., preferably 165 to 176° C. and a weight average molecular weight of 100,000 to 500,000, preferably 100,000 to 300,000, more preferably 150,000 to 250,000.

Therefore, it is preferred that the crystalline polymer (A-1) and the crystalline polymer (B-1) should be made coexistent in an (A-1)/(B-1) weight ratio of 90/10 to 10/90 and heated at 270 to 300° C. (combination 1). The (A-1)/(B-1) weight ratio is more preferably in the range of 60/40 to 40/60.

It is preferred that the crystalline polymer (A-2) and the crystalline polymer (B-1) should be made coexistent in an (A-2)/(B-1) weight ratio of 10/90 to 90/10 and heated at 245 to 300° C. (combination 2). The (A-2)/(B-1) weight ratio is more preferably in the range of 40/60 to 60/40.

Further, it is preferred that the crystalline polymer (B-2) and the crystalline polymer (A-1) should be made coexistent in an (A-1)/(B-2) weight ratio of 10/90 to 90/10 and heated at 245 to 300° C. (combination 3). The (A-1)/(B-2) weight ratio is more preferably in the range of 40/60 to 60/40.

The above combinations are listed below.

|  | Crystalline polymer | amount (mol %) |
| --- | --- | --- |
| Combination 1: | A-1 | $90 \leq [L] \leq 99$ |
|  | B-1 | $90 \leq [D] \leq 99$ |
| Combination 2: | A-2 | $99 < [L] \leq 100$ |
|  | B-1 | $90 \leq [D] \leq 99$ |
| Combination 3: | A-1 | $90 \leq [L] \leq 99$ |
|  | B-2 | $99 < [D] \leq 100$ |

[L]: L-lactic acid unit
[D]: D-lactic acid unit

As described above, a combination of the crystalline polymers (A-2) and (B-2) is excluded as a combination of the crystalline polymers (A) and (B) in the manufacturing process of the present invention. Therefore, this combination is excluded in the following description of the combinations of the crystalline polymers (A) and (B).

The terminal groups of the crystalline polymer (A) and the crystalline polymer (B) used in the present invention may be capped by various ways. Examples of the terminal capping group include acetyl group, ester group, ether group, amide group and urethane group.

The crystalline polymers (A) and (B) can be manufactured by any known polylactic acid polymerization method, as exemplified by the ring opening polymerization of lactide, the dehydration condensation of lactic acid and a combination of any one of them and solid-phase polymerization.

The comonomer components of the crystalline polymers (A) and (B) are each a dicarboxylic acid, polyhydric alcohol, hydroxycarboxylic acid, lactone having a functional group capable of forming two or more ester bonds, and polyesters, polyethers and polycarbonates comprising these as constituent components.

Examples of the dicarboxylic acid include succinic acid, adipic acid, azelaic acid, sebacic acid, terephthalic acid and isophthalic acid. Examples of the polyhydric alcohol include aliphatic polyhydric alcohols such as ethylene glycol, propylene glycol, butanediol, pentanediol, hexanediol, octanediol, glycerin, sorbitan, neopentyl glycol, diethylene glycol, triethylene glycol, polyethylene glycol and polypropylene glycol; and aromatic polyhydric alcohols such as adduct of bisphenol with ethylene oxide. Examples of the hydroxycarboxylic acid include glycolic acid and hydroxybutylcarboxylic acid. Examples of the lactone include glycollide, ε-caprolactone glycollide, ε-caprolactone, β-propiolactone, δ-butyrolactone, β- or γ-butyrolactone, pivalolactone and δ-valerolactone.

The weight average molecular weights of the crystalline polymers (A) and (B) are values in terms of standard polystyrene measured by gel permeation chromatography (GPC) using chloroform as an elutant.

The crystalline polymers (A) and (B) may contain a catalyst for polymerization within limits that do not impair the thermal stability of the resin. The catalyst is a tin compound, aluminum compound, titanium compound, zirconium compound, calcium compound, organic acid or inorganic acid. A stabilizer for deactivating the catalyst may be coexistent at the same time. Examples of the catalyst include aliphatic acid salts, carbonates, sulfates, phosphates, oxides, hydroxides, halides and alcoholates of tin, aluminum, zirconium and titanium, and these metals themselves.

More specific examples of the catalyst include tin octylate, aluminum acetylacetonate, aluminum alkoxide, titanium alkoxide and zirconium alkoxide.

The (A)/(B) weight ratio of the crystalline polymers (A) and (B) in the manufacturing process of the present invention is 10/90 to 90/10. It is preferably 25/75 to 75/25, more preferably 40/60 to 60/40. When the weight ratio is outside the range of 10/90 to 90/10, homocrystallization occurs first and it is difficult to form stereocomplex polylactic acid.

In the present invention, the crystalline polymers (A) and (B) are made coexistent in the above weight ratio and heated at 245 to 300° C.

For the above heat treatment, the polymers (A) and (B) are preferably mixed together. Any mixing method may be employed if they are uniformly mixed together when they are heated. For example, after the crystalline polymers (A) and (B) are mixed together in the presence of a solvent, a mixture is obtained by re-precipitation, or a mixture is obtained by removing the solvent by heating. In this case, preferably, the crystalline polymers (A) and (B) are dissolved in different solvents and the resulting solutions are mixed together, or both the crystalline polymers (A) and (B) are dissolved in a solvent and mixed together.

The solvent is not particularly limited if it dissolves the crystalline polymers (A) and (B). Examples of the solvent include chloroform, methylene chloride, dichloroethane, tetrachloroethane, phenol, tetrahydrofuran, N-methylpyrrolidone, N,N-dimethylformamide, butyrolactone, trioxane and hexafluoroisopropanol which are used alone or in combination of two or more.

Even when the solvent is existent, it is evaporated by heating and the above crystalline polymers (A) and (B) can be heated in the absence of the solvent. The temperature elevation rate after the evaporation of the solvent (heat treatment) is not particularly limited though it is preferably carried out in a short period of time as the crystalline polymers (A) and (B) may decompose when the heat treatment is carried out for a long time.

In the present invention, the crystalline polymers (A) and (B) may be mixed together in the absence of the solvent. That is, predetermined amounts of powders or chips of the crystalline polymers (A) and (B) are mixed together and molten, or molten and kneaded together to be mixed, or any one of the crystalline polymers (A) and (B) is molten and the other crystalline polymer is added to be kneaded and mixed with the molten crystalline polymer.

Therefore, the present invention includes a process for manufacturing polylactic acid by mixing together the crystalline polymers in the presence or absence of a solvent and heating them.

The sizes of the powders or chips of the crystalline polymers (A) and (B) are not particularly limited if they can be uniformly mixed together but preferably 3 mm or less, more preferably 1 to 0.25 mm. When they are molten and mixed together, a stereocomplex crystal is formed regardless of their sizes. When the powders or chips are uniformly mixed together and simply molten and the powders or chips have a diameter of 3 mm or more, a homocrystal also separates out disadvantageously.

In the manufacturing process of the present invention, a mixer used to mix the crystalline polymers (A) and (B) is a batch type reactor equipped with an agitation element, continuous type reactor, or double-screw or single-screw extruder when they are molten to be mixed together, or tumbler type powder mixer, continuous powder mixer or mill when powders of the crystalline polymers (A) and (B) are mixed together.

The expression "heat treatment" in the manufacturing process of the present invention means that the crystalline polymer (A) and the crystalline polymer (B) are made coexistent in the above weight ratio and maintained at a temperature of 245 to 300° C. The heat treatment temperature is preferably 270 to 300° C., more preferably 280 to 290° C. When the temperature is higher than 300° C., it is hard to suppress a decomposition reaction. The heat treatment time is not particularly limited but preferably 0.2 to 60 minutes, preferably 1 to 20 minutes. The heat treatment is carried out in an inert atmosphere at normal pressure or reduced pressure.

As for the apparatus and method used for the heat treatment, an apparatus and method in which heating can be carried out by adjusting the atmosphere may be used. For example, a batch type reactor, continuous type reactor, double-screw or single-screw extruder, press or flow tube type extruder is used to carry out the heat treatment while molding.

Second Aspect

It is an object of the present invention according to the second aspect to provide polylactic acid which contains a stereocomplex crystal and has excellent moldability, a high molecular weight, high crystallinity and a high melting point as well as a manufacturing process thereof. The inventors of the present invention have found that polylactic acid having a high molecular weight, a high content of a stereocomplex crystal and a high melting point can be obtained by melt mixing or solution mixing a specific polylactic acid block copolymer (A) consisting essentially of an L-lactic acid segment and a specific polylactic acid block copolymer (B) consisting essentially of a D-lactic acid segment. The present invention has been accomplished based on this finding.

The present invention is polylactic acid having a melting peak at 195° C. or higher which accounts for 80% or more of the total of melting peaks in the temperature elevation step when measured by a differential scanning calorimeter (DSC), which includes polylactic acid (II) composed of (1) a polylactic acid block copolymer consisting of an L-lactic acid block and a D-lactic acid block and having (2) an average chain length of each block of 5 to 40, (3) a weight ratio of the D-lactic acid unit (component D) to the L-lactic acid unit (component L) of 20/80 to 80/20, (4) a weight average molecular weight of 80,000 to 300,000, and (5) a stereocomplex crystal content of 80 to 100%.

The polylactic acid block copolymer is a block copolymer of an L-lactic acid block and a D-lactic acid block. The L-lactic acid block and the D-lactic acid block have an L-lactic acid unit or D-lactic acid unit represented by the following formula as basic units, respectively.

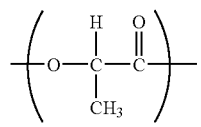

The average chain lengths of the L-lactic acid block and the D-lactic acid block of the polylactic acid block copolymer are 5 to 40, preferably 10 to 30. When the average chain lengths are smaller than 5, crystallinity greatly lowers and sufficiently high heat resistance and dynamic strength cannot be obtained. When the average chain lengths are larger than 40, the stereocomplex crystallization rate lowers disadvantageously.

The weight ratio of the L-lactic acid unit (component L) to the D-lactic acid unit (component D) represented by the above formula contained in the polylactic acid (II) is 20/80 to 80/20, preferably 25/75 to 75/25, more preferably 40/60 to 60/40. When the above ratio is within this range, the polylactic acid (II) having a high melting point is obtained. As the weight ratio becomes farther away from 50/50, the crystallinity of the polylactic acid stereocomplex polymer is impaired more.

The weight average molecular weight of the polylactic acid (II) is 80,000 to 300,000, preferably 90,000 to 250,000, more preferably 100,000 to 200,000. When the molecular weight is low, a molded product having high strength cannot be obtained and when the molecular weight is high, moldability greatly deteriorates disadvantageously. The molecular weight distribution (Mw/Mn) is preferably in the range of 1.5 to 3.0.

The polylactic acid (II) has a stereocomplex crystal content of 80 to 100%, preferably 90 to 100%.

The polylactic acid (II) has a melting peak at 200° C. or higher which accounts for preferably 80% or more, more preferably 90% or more, most preferably 95% or more of the total of melting peaks in the temperature elevation step when measured by a differential scanning calorimeter (DSC).

The polylactic acid (II) has a melting point of 200 to 250° C., preferably 200 to 220° C. The polylactic acid (II) has a melting enthalpy of 20 J/g or more, preferably 30 J/g or more. Preferably, the polylactic acid (II) has a melting peak at 200° C. or higher which accounts for 90% or more of the total of melting peaks in the temperature elevation step when measured by the differential scanning calorimeter (DSC), a melting point of 200 to 250° C. and a melting enthalpy of 20 J/g or more.

The polylactic acid (II) may contain 10 wt % or less of the comonomer component other than the L-lactic acid unit and the D-lactic acid unit represented by the above formula. This comonomer component is a dicarboxylic acid, polyhydric alcohol, hydroxycarboxylic acid or lactone having a functional group capable of forming two or more ester bonds.

<Process for Manufacturing Polylactic Acid (II)>

The polylactic acid (II) can be manufacturing by (iii) melt mixing or solution mixing (i) a polylactic acid block copolymer (A) consisting of an L-lactic acid block (LB) and a D-lactic acid block (DB) in a DB/LB weight ratio of 40/60 to 3/97.5 and having a weight average molecular weight of 80,000 to 300,000 and an average chain length of each block of 5 to 40 and (ii) a polylactic acid block copolymer (B) consisting of an L-lactic acid block (LB) and a D-lactic acid block (DB) in an LB/DB weight ratio of 40/60 to 3/97.5 and having a weight average molecular weight of 80,000 to 300,000 and an average chain length of each block of 5 to 40.

(Polylactic Acid Block Copolymers (A) and (B)) The DB/LB weight ratio of the D-lactic acid block (DB) to the L-lactic acid block (LB) of the polylactic acid block copolymer (A) is 40/60 to 3/97.5, preferably 35/65 to 5/95, more preferably 30/70 to 5/95, most preferably 15/85 to 5/95. When (DB/LB) <3/97, the stereocomplex crystal formation rate may lower disadvantageously. When 40/60<(DB/LB)<60/40, the molecular weight of the polylactic acid block copolymer becomes low, and polylactic acid stereocomplex polymer having excellent heat resistance and a high molecular weight may not be obtained disadvantageously.

The LB/DB weight ratio of the L-lactic acid block (LB) to the D-lactic acid block (DB) of the polylactic acid block copolymer (B) is 40/60 to 3/97.5, preferably 35/65 to 5/95, more preferably 30/70 to 5/95, most preferably 15/85 to 5/95. When (LB/DB)<(3/97), the stereocomplex crystal formation rate may lower disadvantageously. When 40/60<(LB/DB) <60/40, the molecular weight of the polylactic acid block copolymer becomes low, and polylactic acid stereocomplex polymer having excellent heat resistance and a high molecular weight may not be obtained disadvantageously.

The weight average molecular weights of the polylactic acid block copolymers (A) and (B) are both 80,000 to 300,000, preferably 90,000 to 250,000, more preferably 100,000 to 200,000. The molecular weight distribution (Mw/Mn) is preferably in the range of 1.5 to 3.0.

The average chain lengths of the L-lactic acid block and the D-lactic acid block of the polylactic acid block copolymers (A) and (B) are 50 to 40, preferably 10 to 30. When the average chain lengths are smaller than 5, crystallinity greatly lowers and sufficiently high heat resistance and dynamic strength cannot be obtained for use and when the average chain lengths are larger than 40, the stereocomplex crystallization rate lowers disadvantageously.

Both of the polylactic acid block copolymers (A) and (B) have a melting peak at 200° C. or higher and a melting peak at 180° C. or lower when measured by a differential scanning calorimeter (DSC), and the melting peak at 200° C. or higher accounts for preferably 10 to 50% of the total of all the melting peaks.

The weight ratio of the polylactic acid block copolymer (A) to the polylactic acid block copolymer (B) is preferably 90/10 to 10/90, more preferably 75/25 to 25/75, most preferably 60/40 to 40/60.

The terminal groups of the polylactic acid block copolymers (A) and (B) may be capped by various ways. Examples of the terminal capping group include acetyl group, ester group, ether group, amido group and urethane group.

The expression "melt mixing" means that the polylactic acid block copolymers (A) and (B) are mixed together in a molten state.

The melting temperature may be any temperature at which the polylactic acid block copolymers (A) and (B) melt but preferably a temperature as low as possible at which the molten mixture is not solidified so as to suppress a decomposition reaction during melt mixing. Therefore, a higher one of the melting points of the polylactic acid block copolymers (A) and (B) is taken as the lower limit and the polylactic acid block copolymers (A) and (B) are preferably molten at a temperature 50° C., more preferably 30° C., particularly preferably 10 to 20° C. higher than the lower limit value. Specifically, they are melt mixed together at 150 to 220° C.

The atmosphere for melt mixing is not particularly limited, and melt mixing may be carried out at normal pressure or reduced pressure. In the case of normal pressure, it is preferably carried out in a stream of an inert gas such as nitrogen or argon. To remove a monomer formed by decomposition at the time of melting, it is preferably carried out under reduced pressure.

The order of injecting the polylactic acid block copolymers (A) and (B) into the apparatus for melt mixing is not limited. Therefore, the two components may be injected into a mixer at the same time, or the polylactic acid block copolymer (A) is molten and then the polylactic acid block copolymer (B) is injected and mixed with the molten polylactic acid block copolymer (A). These components may be in the form of a powder, granule or pellet. For mixing, a mill roll, mixer, single-screw or double-screw extruder or batch type vessel capable of heating is used to heat and knead these components.

The expression "solution mixing" means that the polylactic acid block copolymers (A) and (B) are dissolved in a solvent and mixed together and then the solvent is removed.

The solvent is not particularly limited if it dissolves the polylactic acid block copolymers (A) and (B). Examples of the solvent include chloroform, methylene chloride, dichloroethane, tetrachloroethane, phenol, tetrahydrofuran, N-methylpyrrolidone, N,N-dimethylformamide, butyrolactone, trioxane and hexafluoroisopropanol which are used alone or in combination of two or more.

The amount of the solvent is preferably such that it ensures that the total amount of the polylactic acid block copolymers (A) and (B) becomes 1 to 30 parts by weight, preferably 1 to 10 parts by weight based on 100 parts by weight of the solvent.

The polylactic acid block copolymers (A) and (B) may be dissolved in different solvents and then mixed together, or one of them may be dissolved in a solvent and the other may be added to and mixed with the resulting solution. The removal of the solvent may be carried out by heating, vacuum distillation, extraction or a combination thereof.

The polylactic acid (II) obtained in the process of the present invention has a stereocomplex crystal content of 80 to 100%, preferably 90 to 100% and a weight average molecular weight of 80,000 to 300,000, more preferably 90,000 to 250,000, most preferably 100,000 to 200,000.

The polylactic acid (II) may contain additives required for processing a resin such as an antioxidant, optical stabilizer, catalyst stabilizer, anti-fungus agent, dye, lubricant, nucleating agent, plasticizer, organic filler or inorganic filler which is used to reinforce the characteristic properties of a resin.

(Manufacture of Polylactic Acid Block Copolymer (A))

The polylactic acid block copolymer (A) used in the process of the present invention can be manufactured by melt mixing or solution mixing poly-L-lactic acid (PLLA) having a weight average molecular weight of 5,000 to 20,000 with poly-D-lactic acid (PDLA) having a weight average molecular weight of 5,000 to 20,000 in a PDLA/PLLA weight ratio of 40/60 to 3/97.5, solidifying the mixture and further solid-phase polymerizing it.

The poly-L-lactic acid and the poly-D-lactic acid can be synthesized by the living stepwise polymerization of lactide which is a cyclic dimer of lactic acid (Makromol. Chem. 191, 481-488 (1990), refer to JP-A 1-225622), the direct ring opening polymerization of racemic lactide in the presence of a specific stereoselective polymerization catalyst (refer to JP-A2003-64174), the melt polymerization of lactic acid or the ring opening polymerization of lactide. The weight average molecular weights of the poly-L-lactic acid and poly-D-lactic acid are preferably 5,000 to 10,000.

The PDLA/PLLA weight ratio of the poly-D-lactic acid (PDLA) to the poly-L-lactic acid (PLLA) is 40/60 to 3/97.5. It is preferably 35/65 to 5/95, more preferably 30/70 to 5/95, most preferably 15/85 to 5/95.

The expression "melt mixing" means that the poly-L-lactic acid and the poly-D-lactic acid are mixed together in a molten state.

The melt mixing temperature may be any temperature at which the poly-L-lactic acid and the poly-D-lactic acid melt but preferably a temperature as low as possible at which the molten mixture is not solidified so as to suppress a decomposition reaction during melt mixing. Therefore, the melting point of the poly-L-lactic acid or the poly-D-lactic acid is taken as the lower limit and the poly-L-lactic acid and the poly-D-lactic acid are preferably molten at a temperature 50° C., more preferably 30° C., particularly preferably 10 to 20°

C. higher than the lower limit value. Specifically, they are melt mixed together at 150 to 200° C.

The atmosphere for melt mixing is not particularly limited, and melt mixing may be carried out at normal pressure or reduced pressure. In the case of normal pressure, it is preferably carried out in a stream of an inert gas such as nitrogen or argon. To remove a monomer formed by decomposition at the time of melting, it is preferably carried out under reduced pressure.

The expression "solution mixing" means that the poly-L-lactic acid and the poly-D-lactic acid are dissolved in a solvent and mixed together and then the solvent is removed.

The solvent is not particularly limited if it dissolves the poly-L-lactic acid and the poly-D-lactic acid. Examples of the solvent include chloroform, methylene chloride, dichloroethane, tetrachloroethane, phenol, tetrahydrofuran, N-methylpyrrolidone, N,N-dimethylformamide, butyrolactone, trioxane and hexafluoroisopropanol which are used alone or in combination of two or more.

The amount of the solvent is preferably such that it ensures that the total amount of the poly-L-lactic acid and the poly-D-lactic acid becomes 1 to 30 parts by weight, preferably 1 to 10 parts by weight based on 100 parts by weight of the solvent.

The poly-L-lactic acid and the poly-D-lactic acid may be dissolved in different solvents and then mixed together, or one of them may be dissolved in a solvent and the other may be added to and mixed with the resulting solution. The removal of the solvent may be carried out by heating.

After the poly-L-lactic acid and the poly-D-lactic acid are melt mixed or solution mixed together, the resulting mixture is solidified by cooling to carry out solid-phase polymerization. The solid-phase polymerization may be carried out at a temperature equal to or higher than the glass transition temperature (Tg) and melting point (Tm) or lower, preferably Tg or higher and a temperature 10° C. lower than Tm, particularly preferably Tg or higher and a temperature 50° C. lower than Tm. Tg and Tm can be measured by DSC.

The solid-phase polymerization is preferably carried out under reduced pressure, for example, 0.01 to 20 hPa, preferably 0.1 to 2 hPa. Since the poly-L-lactic acid and the poly-D-lactic acid are chemically bonded together by an ester reaction or dehydration condensation reaction, $H_2O$ is by-produced along with the proceeding of the reaction. When they are polymerized under reduced pressure, this by-produced water can be removed to the outside of the reaction system and reaction equilibrium can be shifted to a polymerization side. When the pressure exceeds 20 hPa, this dehydration becomes insufficient and when the pressure falls below 0.01 hPa, a further dehydration effect is not obtained. The solid-phase polymerization may also be carried out in an inert gas atmosphere such as nitrogen. The solid-phase polymerization time is at least 5 hours, preferably 5 to 50 hours. The solid-phase polymerization temperature is preferably raised as the degree of polymerization increases. The solid-phase polymerization apparatus is not particularly limited but a concentration drier may be used. A conical drier or drum type heater may also be used.

Preferably, after the solid-phase polymerization, the terminal group is capped to improve the thermal stability of the formed polymer, and further the catalyst and an unreacted monomer are removed by re-precipitation.

(Manufacture of Polylactic Acid Block Copolymer (B))

The polylactic acid block copolymer (B) can be manufactured by melt mixing or mixing in the presence of a solvent poly-L-lactic acid (PLLA) having a weight average molecular weight of 5,000 to 20,000 with poly-D-lactic acid (PDLA) having a weight average molecular weight of 5,000 to 20,000 in a PLLA/PDLA weight ratio of 40/60 to 3/97.5, solidifying the resulting mixture and solid-phase polymerizing it. The polylactic acid block copolymer (B) can be manufactured by the same method as the above-described polylactic acid block copolymer (A) except for the weight ratio of the poly-L-lactic acid and the poly-D-lactic acid.

The polylactic acid block copolymers (A) and (B) may contain a catalyst for polymerization within limits that do not impair the thermal stability of a resin. The catalyst is a tin compound, titanium compound, calcium compound, organic acid or inorganic acid. Further, a stabilizer for deactivating the solvent may be coexistent at the same time.

<Composition>

The present invention includes a composition which contains polylactic acid and a filler in a weight ratio of 98/2 to 1/99. The polylactic acid includes polylactic acid (I) and polylactic acid (II). The filer is preferably an inorganic filler or organic filler.

Examples of the inorganic filler include glass fiber, graphite fiber, carbon fiber, metal fiber, potassium titanate whisker, aluminum borate whisker, magnesium-based whisker, silicon-based whisker, wollastonite, sepiolite, xonotlite, ellestadite, gypsum fiber, silica fiber, silica-alumina fiber, zirconia fiber, silicon nitride fiber, boron fiber, glass flake, non-expansible mica, graphite, metal foil, talc, clay, mica, sericite, bentonite, kaolin, magnesium carbonate, barium sulfate, magnesium sulfate, aluminum hydroxide, magnesium oxide, hydrotalcite, magnesium hydroxide, gypsum and dawsonite.

Examples of the organic filler include natural fibers, para-aramide fiber, polyazole fiber, polyacrylate, polyoxybenzoic acid whisker, polyoxynaphthoyl whisker and cellulose whisker.

These fillers may be fibrous, lamellar or needle-like. Out of these fillers, fibrous inorganic fillers are preferred, and glass fiber is particularly preferred.

The aspect ratio of the filler is preferably 5 or more, more preferably 10 or more, particularly preferably 100 or more. The term "aspect ratio" is a value obtained by dividing the length of a fiber by the diameter of the fiber in the case of a fibrous filler and a value obtained by dividing the length in the long-period direction by the thickness in the case of a lamellar fiber. The elastic modulus of the filler is preferably 50 GPa or more.

The filler may be coated with a thermoplastic resin or thermosetting resin or bundled, treated with a coupling agent such as aminosilane or epoxysilane, or modified with an organic substance. The above fillers may be used alone or in combination of two or more.

The natural fiber preferably has a single-fiber strength of preferably 200 MPa or more, more preferably 300 MPa or more. When the natural fiber has the above strength, it has satisfactory mechanical properties as a composite material and a molded product having excellent surface finish can be obtained as the amount of the filler is reduced.

The natural fiber has a fiber diameter of 0.1 μm to 1 mm, preferably 1 to 500 μm. The aspect ratio (length÷diameter) of the natural fiber is preferably 50 or more. Within this range, the resin and the fiber can be mixed together well and a molded product having excellent physical properties can be obtained by compounding. The aspect ratio is more preferably 100 to 500, most preferably 100 to 300.

Although any natural fiber may be advantageously used if it satisfies the above conditions, especially vegetable fibers such as kenaf, bamboo, flax, hemp, wood pulp and cotton maybe advantageously used. Particularly wood pulp obtained from waste materials, pulp obtained from waste paper and fibers obtained from kenaf are extremely preferred because they have a small load on environment and high regeneration ability.

The natural fiber can be manufactured by any method if its form and strength can be maintained at suitable ranges. Examples of the method include (i) fibrillation by chemical pulping, (ii) fibrillation by biopulping, (iii) explosive fibrillation and (iv) mechanical fibrillation.

The surface of the natural fiber may be modified. The strength of the interface between the fiber and the resin is increased or the durability is preferably improved by the modification of the surface of the natural fiber. To modify the surface of the natural fiber, a method of chemically introducing a functional group, a method of mechanically roughening or smoothing the surface, or a method of reacting a surface modifier by a mechanical stimulus may be employed. The natural fiber may be a single fiber or an assembly of fibers.

The weight ratio of the polylactic acid to the natural fiber in the composition is 98/2 to 1/99. It is preferably 85/15 to 40/60, more preferably 70/30 to 50/50.

The composition may contain at least one additive other than the above fillers, such as a plasticizer, antioxidant, optical stabilizer, ultraviolet light absorber, thermal stabilizer, lubricant, release agent, antistatic agent, flame retardant, foaming agent, filler, anti-fungus/anti-mould agent, nucleating agent, and colorant including dye and pigment within limits not prejudicial to the object of the present invention.

At least one other thermoplastic resin, thermosetting resin or soft thermoplastic resin may be further added to the composition within limits not prejudicial to the object of the present invention.

The composition of the present invention is manufactured by the following methods, for example.
(i) One in which polylactic acid is molten by heating and a natural fiber is uniformly mixed with and dispersed into the polylactic acid.
(ii) One in which a polylactic acid film is formed, a plurality of natural fibers are arranged on the film and a polylactic acid film is formed on the natural fibers. This operation is repeated to obtain a laminate which is then heated at a temperature higher than the melting point of the polylactic acid to be compounded.
(iii) One in which polylactic acid fine particles are adhered to a preformed natural fiber and heated at a temperature higher than the melting point of the polylactic acid to be compounded.
(iv) One in which polylactic acid is made fibrous, and yarn is formed from this fibrous polylactic acid and a natural fiber, formed into a predetermined shape and heated at a temperature higher than the glass transition temperature of the polylactic acid to be compounded.

Since the thus obtained biodegradable composition of the present invention shows sufficiently high strength and the polylactic acid and the natural fiber do not give any load to the environment, it can be advantageously used as various molded products. It is preferably used for structural members and construction materials which require strength, fittings and temporary construction materials. The biodegradable composition of the present invention has a heat deformation temperature (HDT) of preferably 240° C. or lower, more preferably 200° C. or lower, most preferably 170° C. or lower. The composition of the present invention can be used for various application purposes as molded products such as sheets and mats.

<Molded Product>

Injection molded products, extrusion molded products, vacuum molded products, blow molded products, films, sheet nonwoven fabrics, fibers, cloth, composites with other materials, agricultural materials, fishing materials, construction and engineering materials, stationery, medical supplies and other molded products can be obtained from the polylactic acid of the present invention. Molding can be carried out by a commonly used method. The polylactic acid include polylactic acid (I) and polylactic acid (II).

For example, after a solution containing crystalline polymers (A) and (B) in an (A)/(B) weight ratio of 10/90 to 90/10 in a solvent is cast, the solvent is evaporated to form a film-like product which is then heated at 270 to 300° C. to form a film.

EXAMPLES

The following examples are provided for the purpose of further illustrating the present invention but are in no way to be taken as limiting. Values in the examples were obtained by the following methods.
(1) reduced viscosity: 0.12 g of a polymer was dissolved in 10 ml of tetrachloroethane/phenol (volume ratio of 1/1) to measure its reduced viscosity (ml/g) at 35° C.
(2) weight average molecular weight (Mw): The weight average molecular weight of a polymer was obtained by GPC (column temperature of 40° C., chloroform) through comparison with a polystyrene standard sample.
(3) crystallization point, melting point, melting enthalpy and percentage of melting peak at 195° C. or higher: The crystallization point (Tc), melting point (Tm) and melting enthalpy (ΔHm) were measured by DSC in a nitrogen atmosphere at a temperature elevation rate of 20° C./min.

The percentage (%) of a melting peak at 195° C. or higher was calculated from a melting peak area at 195° C. or higher (high temperature) and a melting peak area at 140 to 180° C. (low temperature) based on the following expression.

$$R_{195\ or\ higher}\ (\%) = A_{195\ or\ higher}/(A_{195\ or\ higher} + A_{140\ to\ 180}) \times 100$$

$R_{195\ or\ higher}$: percentage of melting peak at 195° C. or higher
$A_{195\ or\ higher}$: melting peak area at 195° C. or higher
$A_{140\ to\ 180}$: melting peak area at 140 to 180° C.

The percentage (%) of a melting peak at 205° C. or higher was calculated from a melting peak area at 205° C. or higher (high temperature) and a melting peak area at 140 to 180° C. (low temperature) based on the following expression.

$$R_{205\ or\ higher}\ (\%) = A_{205\ or\ higher}/(A_{205\ or\ higher} + A_{140\ to\ 180}) \times 100$$

$R_{205\ or\ higher}$: percentage of melting peak at 205° C. or higher
$A_{205\ or\ higher}$: melting peak area at 205° C. or higher
$A_{140\ to\ 180}$: melting peak area at 140 to 180° C.
(4) Biodegradability test: The biodegradability of a biodegradable composition was evaluated by using a laboratory-scale composting device. The degradation of the composition in the composting device was observed with the eye to judge the existence of degradability. A specific procedure will be described hereinbelow.

About 1 to 1.5 kg of waste vegetable was added to 1.72 kg of porous wood chips (Bio Chip of Matsushita Electric Works, Ltd.) and 0.075 kg of cellulose particles having pores (Bio Ball of Matsushita Electric Works, Ltd.) as vegetable sources in a composting vessel (volume of 11 liters) every day, stirred for 2 minutes every 3 hours and spaded manually once a week, a molded product of a biodegradable composition was injected into the obtained compost having a water content of 50 to 60%, a pH of 7.5 to 8.5 and an inside temperature of 45 to 55° C., and the film was sampled after a predetermined period of time. When the shape of the molded product was obviously decomposed after 30 days of composting, it was judged as degradable.

(5) Heat deformation temperature (HDT): The heat deformation temperature was obtained by the method specified in JIS K 7191.

Production Example 1

Production of Polymer A1

48.75 g of L-lactide (of Musashino Kagaku Kenkyusho Co., Ltd.) and 1.25 g of D-lactide (of Musashino Kagaku Kenkyusho Co., Ltd.) were added to a flask, the inside of the system was substituted by nitrogen, and 0.05 g of stearyl alcohol and 25 mg of tin octylate as a catalyst were added to the flask to carry out polymerization at 190° C. for 2 hours to produce polymer A1. The obtained polymer A1 had a reduced viscosity of 1.48 (ml/g) and a weight average molecular weight of 110,000. Its melting point (Tm) was 158° C. Its crystallization point (Tc) was 117° C.

Production Example 2

Production of Polymer A2

The polymer A1 obtained in Production Example 1 was cleaned with a 7% acetone solution of 5N hydrochloric acid to remove the catalyst so as to obtain polymer A2. The obtained polymer A2 had a reduced viscosity of 1.47 (ml/g) and a weight average molecular weight of 100,000. Its melting point (Tm) was 159° C. Its crystallization point (Tc) was 120° C.

Production Example 3

Production of Polymer A3

10 g of polymer A1 obtained in Production Example 1 was dissolved in 5 ml of pyridine and 200 ml of chloroform, and 9 ml of acetic anhydride was added to the resulting solution at room temperature. After 5 hours of agitation, reflux by heating was carried out for 1 hour to acetylate the terminal of the polymer so as to obtain polymer A3. The obtained polymer A3 had a reduced viscosity of 1.66 (ml/g) and a weight average molecular weight of 110,000. Its melting point (Tm) was 157° C. Its crystallization point (Tc) was 121° C.

Production Example 4

Production of Polymer B1

The procedure of Production Example 1 was repeated except that 1.25 g of L-lactide (of Musashino Kagaku Kenkyusho Co., Ltd.) and 48.75 g of D-lactide (of Musashino Kagaku Kenkyusho Co., Ltd.) were used to produce polymer B1. The polymer B1 had a reduced viscosity of 1.69 (ml/g) and a weight average molecular weight of 140,000. Its melting point (Tm) was 155° C. Its crystallization point (Tc) was 121° C.

Production Example 5

Production of Polymer B2

The procedure of Production Example 2 was repeated except that the polymer B1 was used to remove catalyst so as to obtain polymer B2. The obtained polymer B2 had a reduced viscosity of 1.76 (ml/g) and a weight average molecular weight of 120,000. Its melting point (Tm) was 156° C. Its crystallization point (Tc) was 120° C.

Production Example 6

Production of Polymer B3

The procedure of Production Example 3 was repeated except that the polymer B1 used to acetylate the terminal of the polymer so as to obtain polymer B3. The obtained polymer B3 had a reduced viscosity of 2.06 (ml/g) and a weight average molecular weight of 140,000. Its melting point (Tm) was 158° C. Its crystallization point (Tc) was 122° C.

Production Example 7

Production of Polymer A4

47.50 g of L-lactide (of Musashino Kagaku Kenkyusho Co., Ltd.) and 2.50 g of D-lactide (of Musashino Kagaku Kenkyusho Co., Ltd.) were added to a flask, the inside of the system was substituted by nitrogen, and 25 mg of tin octylate was added to the flask to carry out polymerization at 190° C. for 2 hours to produce polymer A4. The obtained polymer A4 had a reduced viscosity of 2.07 (ml/g) and a weight average molecular weight of 140,000. Its melting point (Tm) was 148° C. Its crystallization point (Tc) was 131° C.

Production Example 8

Production of Polymer B4

The procedure of Production Example 7 was repeated except that 2.50 g of L-lactide (of Musashino Kagaku Kenkyusho Co., Ltd.) and 47.50 g of D-lactide (of Musashino Kagaku Kenkyusho Co., Ltd.) were used to produce polymer B4. The obtained polymer B4 had a reduced viscosity of 1.95 (ml/g) and a weight average molecular weight of 110,000. Its melting point (Tm) was 148° C. Its crystallization point (Tc) was 133° C.

Example 1

A 5% chloroform solution of the polymer A1 and a 5% chloroform solution of the polymer B1 were mixed together in a ratio of 1:1 to carry out cast film formation, and the cast film was heated in a nitrogen atmosphere to evaporate chloroform, further heated up to 280° C. at a rate of 20° C./min, maintained at that temperature for 3 minutes and quenched with liquid nitrogen to obtain a film. The obtained film had a weight average molecular weight of 140,000. This film was measured by DSC. As a result, a melting peak was observed at a melting point of 202° C. in the DSC chart and the melting enthalpy of the film was 33 J/g. No melting peak was observed at 140 to 180° C., and the percentage ($R_{195\ or\ higher}$) of the melting peak at 195° C. or higher was 100%. The crystallization point of the film was 117° C. This DSC chart is shown in FIG. 1.

Example 2

The procedure of Example 1 was repeated except that a 5% chloroform solution of the polymer A4 and a 5% chloroform solution of the polymer B4 were used. The obtained film had a weight average molecular weight of 120,000. A melting peak was observed at a melting point of 199° C. in the DSC chart and the melting enthalpy of the film was 42 J/g. The $R_{195\ or\ higher}$ was 99.99%. The crystallization point was 108° C.

Example 3

Polymer A2 and polymer B2 were added to a flask in a ratio of 1:1, the inside of the system was substituted by nitrogen, and the flask was heated up to 280° C. to melt blend together these polymers at 280° C. for 3 minutes. The obtained resin had a weight average molecular weight of 110,000 and a reduced viscosity of 1.46 ml/g which were almost the same as the molecular weights and reduced viscosities of the polymer A2 and the polymer B2. This resin was measured by DSC. As a result, a melting peak was observed at a melting point of 207° C. in the DSC chart and the melting enthalpy of the resin was 40 J/g. No melting peak was observed at 140 to 180° C. and the percentage ($R_{195\ or\ higher}$) of a melting peak at 195° C. or higher was 100%. The crystallization point was 112° C.

Example 4

The procedure of Example 3 was repeated except that polymer A and polymer B were used. The obtained resin had a weight average molecular weight of 120,000 and a reduced viscosity of 1.60 ml/g which were almost the same as the molecular weights and reduced viscosities of the polymer A3 and the polymer B3. This resin was measured by DSC. As a result, a melting peak was observed at a melting point of 202° C. in the DSC chart and the melting enthalpy of the resin was 39 J/g. The percentage ($R_{195\ or\ higher}$) of a melting peak at 195° C. or higher was 99.99%. The crystallization point was 110° C.

Example 5

The procedure of Example 1 was repeated except that 10 wt % of lactide added to a 5% chloroform solution of the polymer A2 and a 5% chloroform solution of the polymer B2 was used. The obtained film had a weigh average molecular weight of 110,000. A melting peak was observed at a melting point of 202° C. in the DSC chart, and the melting enthalpy of the film was 24 J/g. The percentage ($R_{195\ or\ higher}$) of a melting peak at 195° C. or higher was 90%. The crystallization-point was 107° C.

Example 6

5 g of a 3 mm-diameter chip of the polymer A2 and 5 g of a 3 mm-diameter chip of the polymer B2 were added to a test tube and molten at 280° C. The obtained molten product was quenched with liquid nitrogen immediately. The obtained polymer had a weight average molecular weight of 100,000. A melting peak was observed at a melting point of 206° C. in the DSC chart, and the melting enthalpy of the polymer was 26 J/g. The percentage ($R_{195\ or\ higher}$) of a melting peak at 195° C. or higher was 91%. The crystallization point was 113° C.

Comparative Example 1

After cast film formation, the procedure of Example 1 was repeated except that the cast film was heated at 240° C. The obtained film had a weight average molecular weight of 140,000. Melting peaks were observed at melting points of 161° C. and 206° C. in the DSC chart. The $R_{195\ or\ higher}$ was 51%.

Comparative Example 2

The procedure of Example 1 was repeated except that poly-L-lactic acid (PLLA) and poly-D-lactic acid (PDLA) shown below were used to obtain a film. The obtained film was measured by DSC. As a result, melting peaks were observed at a melting point of 173° C. and a melting peak of 220° C. The $R_{195\ or\ higher}$ was 40%.
PLLA: 99.5 mol % of L-lactic acid unit, 0.5 mol % of D-lactic acid unit, reduced viscosity of 2.70 ml/g, weight average molecular weight of 250,000, melting point (Tm) of 166° C., crystallization point (Tc) of 125° C.
PDLA: 99.3 mol % of D-lactic acid unit, 0.7 mol % of L-lactic acid unit, reduced viscosity of 2.80 ml/g, weight average molecular weight of 260,000, melting point (Tm) of 168° C., crystallization point (Tc) of 122° C.

TABLE 1

| | Type of polymer | L/D (molar ratio) | reduced viscosity (mL/g) | Mw | Tm(° C.) | Tc(° C.) |
|---|---|---|---|---|---|---|
| Production Example 1 | A1 | 97.5/2.5 | 1.48 | $11 \times 10^4$ | 158 | 117 |
| Production Example 2 | A2 | 97.5/2.5 | 1.47 | $10 \times 10^4$ | 159 | 120 |
| Production Example 3 | A3 | 97.5/2.5 | 1.66 | $11 \times 10^4$ | 157 | 121 |
| Production Example 4 | B1 | 2.5/97.5 | 1.69 | $14 \times 10^4$ | 155 | 121 |
| Production Example 5 | B2 | 2.5/97.5 | 1.76 | $12 \times 10^4$ | 156 | 120 |
| Production Example 6 | B3 | 2.5/97.5 | 2.06 | $14 \times 10^4$ | 158 | 122 |
| Production Example 7 | A4 | 95/5 | 2.07 | $14 \times 10^4$ | 148 | 131 |
| Production Example 8 | B4 | 5/95 | 1.95 | $11 \times 10^4$ | 148 | 133 |

TABLE 2

| | Polymer A | Polymer B | A/B (weight ratio) | Temperature (° C.) | blending method | Mw | Tm (° C.) | Δ Hm (J/g) | $R_{195\ or\ higher}$ (%) | Tc (° C.) |
|---|---|---|---|---|---|---|---|---|---|---|
| Ex. 1 | A1 | B1 | 50/50 | 280 | Solution blending | $14 \times 10^4$ | 202 | 33 | 100 | 117 |
| Ex. 2 | A4 | B4 | 50/50 | 280 | Solution blending | $12 \times 10^4$ | 199 | 42 | 99.99 | 108 |
| Ex. 3 | A2 | B2 | 50/50 | 280 | Melt blending | $11 \times 10^4$ | 207 | 40 | 100 | 112 |
| Ex. 4 | A3 | B3 | 50/50 | 280 | Melt blending | $12 \times 10^4$ | 202 | 39 | 99.99 | 110 |
| Ex. 5 | A2 | B2 | 50/50 lactide 10 | 280 | Solution blending | $11 \times 10^4$ | 202 | 24 | 90 | 107 |
| Ex. 6 | A2 | B2 | 50/50 | 280 | Powder mixing and melt blending | $10 \times 10^4$ | 206 | 26 | 91 | 113 |
| C. Ex. 1 | A1 | B1 | 50/50 | 240 | Solution blending | $14 \times 10^4$ | 161/206 | 6.3/6.6 | 51 | 135 |
| C. Ex. 2 | PLLA | PDLA | 50/50 | 280 | Solution blending | $25 \times 10^4$ | 173/220 | 29/19 | 40 | 121 |

Ex.: Example
C. Ex.: Comparative Example

Production Example 9

Production of Polymer B5

1.25 g of L-lactide (of Musashino Kagaku Kenkyusho Co., Ltd.) and 48.75 g of D-lactide (of Musashino Kagaku Kenkyusho Co., Ltd.) were added to a flask, the inside of the system was substituted by nitrogen, and 25 mg of tin octylate as a catalyst were added to the flask to carry out polymerization at 190° C. for 2 hours so as to produce polymer B5. The obtained polymer B5 had a reduced viscosity of 2.26 (ml/g) and a weight average molecular weight of 190,000. Its melting point (Tm) was 156° C. Its crystallization point (Tc) was 117° C.

Production Example 10

Production of Polymer B6

1.25 g of L-lactide (of Musashino Kagaku Kenkyusho Co., Ltd.) and 48.75 g of D-lactide (of Musashino Kagaku Kenkyusho Co., Ltd.) were added to a flask, the inside of the system was substituted by nitrogen, and 0.05 g of stearyl alcohol and 25 mg of tin octylate as a catalyst were added to the flask to carry out polymerization at 190° C. for 2 hours so as to produce a polymer. This polymer was cleaned with a 7% acetone solution of 5N hydrochloric acid to remove the catalyst so as to obtain polymer B6. The obtained polymer B6 had a reduced viscosity of 2.71 (ml/g) and a weight average molecular weight of 200,000. Its melting point (Tm) was 159° C. Its crystallization point (Tc) was 132° C.

Production Example 11

Production of Polymer A5

50 g of L-lactide (of Musashino Kagaku Kenkyusho Co., Ltd.) was added to a flask, the inside of the system was substituted by nitrogen, and 0.1 g of stearyl alcohol and 25 mg of tin octylate as a catalyst were added to the flask to carry out polymerization at 190° C. for 2 hours so as to produce polymer A5. The obtained polymer A5 had a reduced viscosity of 2.92 (ml/g) and a weight average molecular weight of 190,000. Its melting point (Tm) was 168° C. Its crystallization point (Tc) was 122° C.

Production Example 12

Production of Polymer A6

50 g of L-lactide (of Musashino Chemical Laboratory, Ltd.) was added to a flask, the inside of the system was substituted by nitrogen, and 0.1 g of stearyl alcohol and 25 mg of tin octylate as a catalyst were added to the flask to carry out polymerization at 190° C. for 2 hours so as to produce a polymer. This polymer was cleaned with a 7% acetone solution of 5N hydrochloric acid to remove the catalyst so as to obtain polymer A6. The obtained polymer A6 had a reduced viscosity of 2.65 (ml/g) and a weight average molecular weight of 200,000. Its melting point (Tm) was 176° C. Its crystallization point (Tc) was 139° C.

Production Example 13

Production of Polymer D1

48.75 g of L-lactide (of Musashino Kagaku Kenkyusho Co., Ltd.) and 1.25 g of D-lactide (of Musashino Kagaku Kenkyusho Co., Ltd.) were added to a flask, the inside of the system was substituted by nitrogen, and 0.1 g of stearyl alcohol and 25 mg of tin octylate as a catalyst were added to the flask to carry out polymerization at 190° C. for 2 hours so as to produce polymer D1. The obtained polymer D1 had a reduced viscosity of 2.48 (ml/g) and a weight average molecular weight of 170,000. Its melting point (Tm) was 158° C. Its crystallization point (Tc) was 117° C.

Production Example 14

Production of Polymer C1

50 g of D-lactide (of Musashino Kagaku Kenkyusho Co., Ltd.) was added to a flask, the inside of the system was substituted by nitrogen, and 0.1 g of stearyl alcohol and 25 mg of tin octylate as a catalyst were added to the flask to carry out polymerization at 190° C. for 2 hours so as to produce a polymer. This polymer was cleaned with a 7% acetone solution of 5N hydrochloric acid to remove the catalyst so as to obtain polymer C1. The obtained polymer C1 had a reduced viscosity of 2.80 (ml/g) and a weight average molecular weight of 220,000. Its melting point (Tm) was 168° C. Its crystallization point (Tc) was 122° C.

Example 7

A 5% chloroform solution of the polymer B5 and a 5% chloroform solution of the polymer A5 were mixed together in a ratio of 1:1 to carry out cast film formation, and the cast film was heated in a nitrogen atmosphere to evaporate chloroform, further heated up to 280° C. at a rate of 20° C./min, maintained at that temperature for 3 minutes and quenched with liquid nitrogen to obtain a film.

Figure 2:
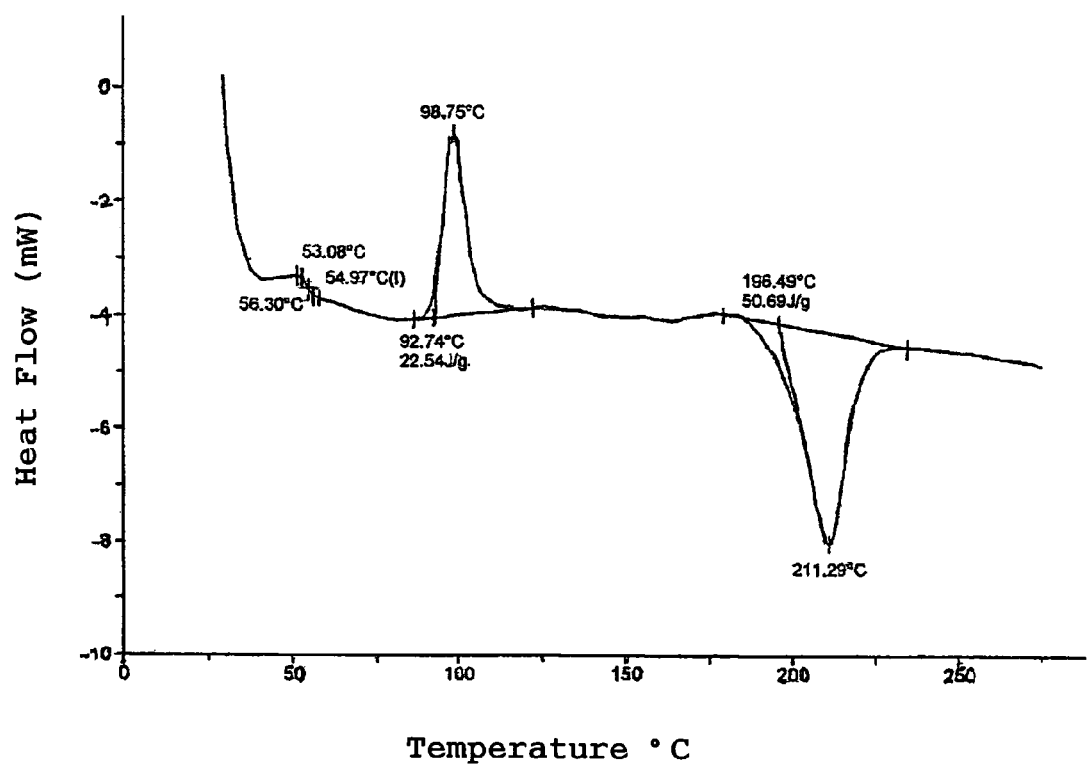
FIG. 2 is a DSC chart of the polylactic acid obtained in Example 7.

The obtained film had a weight average molecular weight of 190,000. This film was measured by DSC. As a result, a melting peak was observed at a melting point of 211° C. in the DSC chart, and the melting enthalpy of the film was 51 J/g. No melting peak was observed at 140 to 180° C., and the percentage ($R_{205\ or\ higher}$) of a melting peak at 205° C. or higher was 100%. The crystallization point was 99° C. This DSC chart is shown in FIG. 2.

Example 8

The polymer B6 and the polymer A6 were added to a flask in a ratio of 1:1, and the inside of the system was substituted by nitrogen, and the flask was heated up to 260° C. to melt blend together these polymers at 260° C. for 3 minutes.

The obtained resin had a weight average molecular weight of 160,000 and a reduced viscosity of 2.65 ml/g.

This resin was measured by DSC. As a result, a melting peak was observed at a melting point of 209° C. in the DSC chart, and the melting enthalpy of the resin was 32 J/g. Although a melting peak was slightly observed at 140 to 180° C., the percentage ($R_{205\ or\ higher}$) of a melting peak at 205° C. or higher was 93%. The crystallization point was 116° C.

Example 9

The procedure of Example 8 was repeated except that heating was carried out at 280° C.

The obtained resin had a weight average molecular weight of 160,000 and a reduced viscosity of 2.42 ml/g.

This resin was measured by DSC. As a result, a melting peak was observed at a melting point of 209° C. in the DSC chart, and the melting enthalpy of the resin was 38 J/g. No melting peak was observed at 140 to 180° C. and the percentage ($R_{205\ or\ higher}$) of a melting peak at 205° C. or higher was 100%. The crystallization point was 107° C.

Example 10

The polymer C1 and the polymer D1 were added to a flask in a ratio of 1:1, the inside of the system was substituted by nitrogen, and the flask was heated up to 260° C. to melt blend together these polymers at 260° C. for 3 minutes.

The obtained resin had a weight average molecular weight of 150,000 and a reduced viscosity of 2.35 ml/g.

This resin was measured by DSC. As a result, a melting peak was observed at a melting point of 211° C. in the DSC chart, and the melting enthalpy of the resin was 31 J/g. A melting peak was rarely observed at 140 to 180° C., and the percentage ($R_{205\ or\ higher}$) of a melting peak at 205° C. or higher was 97%. The crystallization point was 114° C.

Comparative Example 3

After cast film formation, the procedure of Example 1 was repeated except that heating was carried out at 240° C.

The obtained film had a weight average molecular weight of 190,000. A peak derived from a homocrystal and a peak derived from a stereocomplex crystal were observed in the DSC chart. The $R_{205\ or\ higher}$ was 39%.

Comparative Example 4

The procedure of Example 1 was carried out except that poly-L-lactic acid (PLLA) and poly-D-lactic acid (PDLA) shown below were used to obtain a film. The obtained film was measured by DSC. As a result, melting peaks were observed at melting points of 173° C. and 220° C. The $R_{205\ or\ higher}$ was 40%.
PLLA: 99.5 mol % of L-lactic acid unit, 0.5 mol % of D-lactic acid unit, reduced viscosity of 2.70 ml/g, weight average molecular weight of 250,000, melting point (Tm) of 166° C., crystallization point (Tc) of 125° C.
PDLA: 99.3 mol % of D-lactic acid unit, 0.7 mol % of L-lactic acid unit, reduced viscosity of 2.80 ml/g, weight average molecular weight of 260,000, melting point (Tm) of 168° C., crystallization point (Tc) of 122° C.

TABLE 3

|  | Type of polymer | L/D (molar ratio) | reduced viscosity (mL/g) | Mw | Tm(° C.) | Tc(° C.) |
|---|---|---|---|---|---|---|
| Production Example 9 | B5 | 2.5/97.5 | 2.26 | $19 \times 10^4$ | 156 | 117 |
| Production Example 10 | B6 | same as above | 2.71 | $20 \times 10^4$ | 159 | 132 |
| Production Example 11 | A5 | 100/0 | 2.92 | $19 \times 10^4$ | 168 | 122 |
| Production Example 12 | A6 | same as above | 2.65 | $20 \times 10^4$ | 176 | 139 |
| Production Example 13 | D1 | 97.5/2.5 | 2.48 | $17 \times 10^4$ | 158 | 117 |
| Production Example 14 | C1 | 0/100 | 2.80 | $22 \times 10^4$ | 168 | 122 |

TABLE 4

| | Type of polymer | Type of polymer | weight ratio | Temperature (° C.) | blending method | Mw | Tm (° C.) | ΔHm (J/g) | $R_{205\ or\ higher}$ (%) | Tc (° C.) |
|---|---|---|---|---|---|---|---|---|---|---|
| Ex. 7 | B5 | A5 | 50/50 | 280 | Solution blending | $19 \times 10^4$ | 211 | 51 | 100 | 99 |
| Ex. 8 | B6 | A6 | 50/50 | 260 | Melt blending | $16 \times 10^4$ | 209 | 32 | 93 | 116 |
| Ex. 9 | B6 | A6 | 50/50 | 280 | Melt blending | $16 \times 10^4$ | 209 | 38 | 100 | 107 |
| Ex. 10 | C1 | D1 | 50/50 | 260 | Melt blending | $15 \times 10^4$ | 211 | 31 | 97 | 114 |
| C. Ex. 3 | B5 | A5 | 50/50 | 240 | Solution blending | $19 \times 10^4$ | 158, 173/208 | 23/15 | 39 | 126 |
| C. Ex. 4 | PDLA | PLLA | 50/50 | 280 | Solution blending | $25 \times 10^4$ | 173/220 | 29/19 | 40 | 121 |

Ex.: Example
C. Ex.: Comparative Example

Production Example 15

Production of Polymer A7

48.75 parts by weight of L-lactide (of Musashino Kagaku Kenkyusho Co., Ltd.) and 1.25 parts by weight of D-lactide (of Musashino Kagaku Kenkyusho Co., Ltd.) were added to a polymerizer, the inside of the system was substituted by nitrogen, 0.05 part by weight of stearyl alcohol and $25 \times 10^{-3}$ part by weight of tin octylate as a catalyst were added to the flask to carry out polymerization at 190° C. for 2 hours so as to produce polymer A7. The obtained polymer A7 had a reduced viscosity of 1.48 (ml/g) and a weight average molecular weight of 110,000. Its melting point (Tm) was 158° C. Its crystallization point (Tc) was 117° C.

Production Example 16

Production of Polymer B7

The procedure of Production Example 15 was repeated except that 1.25 parts by weight of L-lactide (of Musashino Kagaku Kenkyusho Co., Ltd.) and 48.75 parts by weight of D-lactide (of Musashino Kagaku Kenkyusho Co., Ltd.) were used to produce polymer B1. The obtained polymer B7 had a reduced viscosity of 1.69 (ml/g) and a weight average molecular weight of 140,000. Its melting point (Tm) was 155° C. Its crystallization point (Tc) was 121° C.

Example 11

The polymer A7 and the polymer B7 were added to a flask in a ratio of 1:1, the inside of the system was substituted by nitrogen, and the flask was heated up to 280° C. to melt blend together these polymers at 280° C. for 3 minutes. The obtained resin had a weight average molecular weight of 110,000 and a reduced viscosity of 1.46 ml/g which were almost the same as the molecular weights and reduced viscosities of the polymer A7 and the polymer B7. This resin was measured by DSC. As a result, a melting peak was observed at a melting point of 207° C. in the DSC chart, and the melting enthalpy of the resin was 40 J/g. No melting peak was observed at 140 to 180° C., and the percentage ($R_{195\ or\ higher}$) of a melting peak at 195° C. or higher was 100%. The crystallization point was 112° C.

3 g of the obtained resin was dissolved in 50 ml of chloroform to prepare a resin solution. A 12 mm×120 mm (weight of 3 g) piece was cut out from a mat (thickness of 10 mm) of a kenaf fiber (fiber diameter of 200 μm, fiber strength of 300 MPa), immersed in the above resin solution and dried. After drying, the piece was heat pressed at 170° C. to obtain a molded product. The obtained molded product had an HDT of 160° C. It was judged as biodegradable.

Example 12

The polymer A7 and the polymer B7 were added to a flask in a ratio of 1:1, the inside of the system was substituted by nitrogen, and the flask was heated up to 280° C. to melt blend together these polymers at 280° C. for 3 minutes. The obtained resin had a weight average molecular weight of 110,000 and a reduced viscosity of 1.46 ml/g which were almost the same as the molecular weights and reduced viscosities of the polymer A7 and the polymer B7. This resin was measured by DSC. As a result, a melting peak was observed at a melting point of 207° C. in the DSC chart, and the melting enthalpy of the resin was 40 J/g. No melting peak was observed at 140 to 180° C., and the percentage ($R_{195\ or\ higher}$) of a melting peak at 195° C. or higher was 100%. The crystallization point was 112° C.

3 g of the obtained resin was dissolved in 50 ml of chloroform to prepare a resin solution. A 12 mm×120 mm (weight of 3 g) piece was cut out from a mat (thickness of 10 mm) of a kenaf fiber (fiber diameter of 200 μm, fiber strength of 300 MPa), immersed in the above resin solution and dried. After drying, the piece was heat pressed at 200° C. to obtain a molded product. The obtained molded product had an HDT of 168° C. It was judged as biodegradable.

Example 13

35 parts by weight of a chip of the polymer A7, 35 parts by weight of a chip of the polymer B7 and 30 parts by weight of a kenaf chopped fiber (fiber diameter of 200 μm, fiber length of 5 mm, fiber strength of 300 MPa) were mixed together. This mixture was injected into an injection molding machine having three temperature setting zones of a melting cylinder which were set to 200° C., 230° C. and 265° C. from the injection port side (PS-20 small-sized injection molding machine of Nissei Jushi Kogyo Co., Ltd.) to be injection molded at a mold temperature of 90° C. so as to obtain a molded product. The obtained molded product had an HDT of 170° C. It was judged as biodegradable.

Comparative Example 5

3 g of PLLA synthesized from 500 parts by weight of L-lactide in accordance with Production Example 15 was dissolved in 50 ml of chloroform to prepare a resin solution. A 12 mm×120 mm (weight of 3 g) piece was cut out from a mat (thickness of 10 mm) of a kenaf fiber (fiber diameter of 200 μm, fiber strength of 300 MPa), immersed in the above resin solution and dried. After drying, the piece was heat pressed at 200° C. to obtain a molded product. The obtained molded product had an HDT of 90° C.

Physical properties were obtained by the following method in examples below.

(1) Weight Average Molecular Weight (Mw) and Number Average Molecular Weight (Mn)

These were measured by gel permeation chromatography (GPC) in terms of standard polystyrene. GPC measurement instruments are as follows.

Detector: RID-6A differential refractometer of Shimadzu Corporation
Pump: LC-9A of Shimadzu Corporation
Column: TSKgelG3000HXL, TSKgelG4000HXL, TSKgelG5000HXL and TSKguardcokumnHXL-L of Tosoh Corporation were connected in series, or TSKgelG2000HXL, TSKgelG3000HXL and TSKguardcokumnHXL-L were connected in series.

Chloroform was used as an elutant and flown at a temperature of 40° C. and a flow rate of 1.0 ml/min, and 10 μl of a specimen having a concentration of 1 mg/ml (chloroform containing 1% of hexafluoroisopropanol) was injected.

(2) Measurement of Average Chain Length of Block

13CNMR device: BURKER ARX-500 of Nippon Burker Co., Ltd.
sample: 50 mg/0.7 ml
measurement solvent: 10% HFIP containing deuterated chloroform
internal standard: tetramethylsilane (TMS) 1% (v/v)
measurement temperature: 27° C. (300 K)
measurement frequency: 125 MHz It was found by $^{13}$C-NMR measurement that out of carbon peaks attributed to carbonyl carbon (C=O), peak (a) (around 170.1 to 170.3 MHz) was attributed to a homosequence (LLLLLL or DDDDDD) and peak (b) (around 170.0 to 169.8 MHz) was attributed to a racemic chain (LLLDDD . . . ), and the average chain length was calculated from the integral value of these peaks in accordance with the following expression.

$$v = \text{integral value of peak } (a)/\text{integral value of peak } b$$

(3) Thermal Properties

The DSC-60 differential scanning calorimeter DSC of Shimadzu Corporation was used.

As for measurement, 10 mg of a specimen was heated from room temperature to 250° C. at a temperature elevation rate of 10° C./min in a nitrogen atmosphere, left to be cooled for 20 minutes and heated to 250° C. again at a temperature elevation rate of 10° C./min. The homocrystal melting temperature (Tmh), homocrystal melting heat (ΔHmh), stereocomplex crystal melting temperature (Tms) and stereocomplex crystal melting heat (ΔHms) were measured by the first scanning. The crystallization temperature (Tc) was obtained by the second scanning.

(4) Percentage of Melting Peak at 200° C. or Higher ($R_{200\ or\ Higher}$)

The percentage (%) of a melting peak at 200° C. or higher was calculated from a melting peak area at 200° C. or higher (high temperature) and a melting peak area at 140 to 180° C. (low temperature based on the following expression.

$$R_{200\ or\ higher}(\%) = A_{200\ or\ higher}/(A_{200\ or\ higher} + A_{140\ to\ 180}) \times 100$$

$R_{200\ or\ higher}$: percentage of melting peak at 200° C. or higher
$A_{200\ or\ higher}$: melting peak area at 200° C. or higher
$A_{140\ to\ 180}$: melting peak area at 140 to 180° C.

(5) Total Crystallinity ($\chi c(total)$)

The crystallinity was obtained as follows.

The crystallinity was calculated from the homocrystal melting heat (ΔHmh) and the stereocomplex crystal melting heat (ΔHms) actually obtained by DSC based on the following expression when the homocrystal melting heat (ΔHmh0) of 100% crystallized polylactic acid was −203.4 J/g and the stereocomplex crystal melting heat (ΔHms0) of 100% crystallized polylactic acid was −142 J/g.

$$\chi c\ (total)\ (\%) = 100 \times (\Delta Hmh/\Delta Hmh0 + \Delta Hms/\Delta Hms0)$$

(6) Stereocomplex Crystallization Rate ($\chi c(SC)$)

Further, the content of the stereocomplex crystal was calculated based on the following expression.

$$\chi c(SC)(\%) = 100 \times [(\Delta Hms/\Delta Hms0)/(\Delta Hmh/\Delta Hmh0 + \Delta Hms/\Delta Hms0)]$$

(7) Optical Purity (%)

The optical purity was obtained from the ratio of L-lactic acid and D-lactic acid constituting poly-L-lactic acid and poly-D-lactic acid.

5 ml of 5M sodium hydroxide and 2.5 ml of isopropanol were added to 1 g of a specimen to carry out hydrolysis while they were stirred under heating at 40° C., and the reaction solution was neutralized with 1 M sulfuric acid. The concentration was adjusted by diluting 1 ml of the neutralized solution 25 times. The detection peak areas of the L-lactic acid and D-lactic acid were measured with ultraviolet radiation having a wavelength of 254 nm by HPLC, and the optical purity (%) was calculated from the weight percentage [L] (%) of L-lactic acid and the weight percentage [D] (%) of D-lactic acid constituting a polylactic acid polymer based on the following expression.

The LC-6A pump of Shimadzu Corporation, the SPD-6AV UV detector of Shimadzu Corporation and the SUMICHIRAL OA-5000 column of Sumika Bunseki Center Co., Ltd. were used as HPLC equipment, and a 1 mM aqueous solution of copper sulfate was used as an elutant to measure at a flow rate of 1.0 ml/min and 40° C.

$$\text{Optical purity (\%)} = 100 \times [L]/([L]+[D])\ (\text{or } 100 \times [D]/([L]+[D]))$$

Production Example 17

Preparation of poly-L-lactic Acid 1 kg of an aqueous solution containing 90 wt % of L-lactic acid (of Musashino Kagaku Kenkyusho Co., Ltd.) was stirred at 150° C. and 4,000 Pa for 6 hours to distill out water so as to obtain an oligomer. 0.2 g of stannous chloride and 0.2 g of p-toluenesulfonic acid were added to this oligomer to melt polymerize it at 180° C. and 1,300 Pa for 6 hours. After cooling, the obtained solid was ground to obtain poly-L-lactic acid having a weight average molecular weight of 7,800 and a Tm of 153° C. It had an optical purity of 99.2%.

Production Example 18

Preparation of poly-D-lactic Acid

The procedure of Production Example 17 was repeated by using an aqueous solution containing 90 wt % of D-lactic acid (of Musashino Kagaku Kenkyusho Co., Ltd.) to obtain poly- D-lactic acid having a weight average molecular weight of 8,000 and a Tm of 154° C. It had an optical purity of 99.0%.

Production Example 19

Preparation of Polylactic Acid Block Copolymer A8

Figure 3:
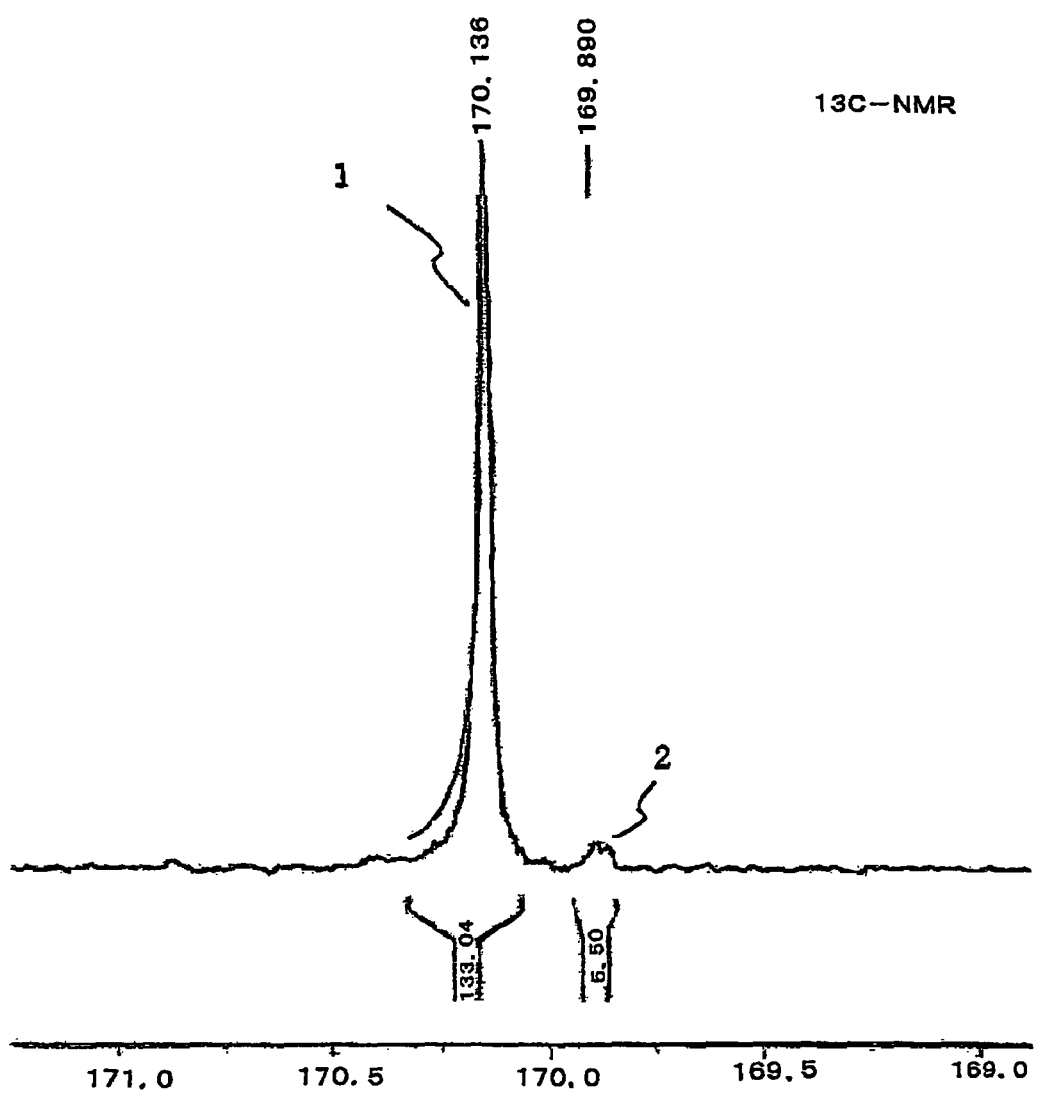
FIG. 3 is a $^{13}$C-NMR measurement chart of the polylactic acid obtained in Production Example 19.

80 g of the poly-L-lactic acid obtained in Production Example 17 and 20 g of the poly-D-lactic acid obtained in Production Example 18 were mixed together and heated at normal pressure for 5 minutes. It was confirmed that the temperature of the resin during mixing was gradually raised from the melting points of the polymers and they were uniformly mixed at 175° C. This poly-D/L-lactic acid blend was solidified by cooling and ground to obtain a particulate blend. This product was gradually heated at 140° C. under reduced pressure (0.5 mmHg) for 10 hours, at 150° C. for 10 hours and further at 160° C. for 10 hours (30 hours in total) to carry out solid-phase polymerization so as to obtain a polylactic acid stereoblock copolymer A8. The weight average molecular weight (Mw), polydispersion degree (Mw/Mn) and average chain length v of this polylactic acid block copolymer A8 were measured ($^{13}$C-NMR measurement chart is shown in FIG. 3). These results are shown in Table 5.

Production Example 20

Preparation of Polylactic Acid Block Copolymer B8

The procedure of Production Example 19 was repeated by using 80 g of the poly-D-lactic acid obtained in Production Example 18 and 20 g of the poly-L-lactic acid obtained in Production Example 17 to obtain a polylactic acid stereoblock copolymer B8. The properties of this copolymer were evaluated in the same manner as in Production Example 19. The results are shown in Table 5.

Production Example 21

Preparation of Polylactic Acid Block Copolymer A9

The procedure of Production Example 19 was repeated except that poly-L-lactic acid and poly-D-lactic acid were mixed together in a ratio of 90:10 to obtain a polylactic acid block copolymer A9. The properties of this copolymer were evaluated in the same manner as in Production Example 19. The results are shown in Table 5.

Production Example 22

Preparation of Polylactic Acid Block Copolymer B9

The procedure of Production Example 20 was repeated except that poly-D-lactic acid and poly-L-lactic acid were mixed together in a ratio of 90:10 to obtain a polylactic acid block copolymer B9. The properties of this copolymer were evaluated in the same manner as in Production Example 20. The results are shown in Table 5.

Example 14

0.5 g of the polylactic acid block copolymer A8 and 0.5 g of the polylactic acid block copolymer B8 were dissolved in a mixed solvent of 9 ml of chloroform and 1 ml of HFIP (1,1,1,3,3,3-hexafluoroisopropanol) (total amount of 20 ml) and mixed together in an L/D ratio of 50/50. After 20 minutes of mixing and agitation, the obtained solution was poured into a glass Petri dish and left to stand at room temperature and normal pressure for 15 hours. Thereafter, it was continuously dried in a vacuum oven at room temperature for 2 hours, at 60° C. for 2 hours and at 80° C. for 6 hours.

The crystallization temperature (Tc), homocrystal melting temperature (Tmh), stereocomplex crystal melting temperature (Tms), homocrystal melting heat (ΔHmh) and stereocomplex crystal melting heat (ΔHms) of the obtained polylactic acid stereocomplex polymer were measured. These results are shown in Table 6. The percentage ($R_{200\ or\ higher}$) of a melting peak at 200° C. or higher, total crystallinity ($\chi c$ (total)) and the content of stereocomplex crystal ($\chi c(SC)$) are shown in Table 6.

Example 15

1 g of the polylactic acid block copolymer A8 and 1 g of the polylactic acid block copolymer B8 were dissolved in 18 ml of chloroform, and 1 to 2 drops of acetic anhydride were added and stirred for 1 hour to cap the terminals of the copolymers. Thereafter, 2 ml of HFIP was added to completely dissolve these copolymers, and they were re-precipitated in 200 ml of methanol, suction filtered and dried. They were continuously dried in a vacuum oven at room temperature for 2 hours, at 60° C. for 2 hours and at 80° C. for 6 hours.

0.5 g of the polylactic acid block copolymer A8 and 0.5 g of the polylactic acid block copolymer B8 after terminal capping and purification were dissolved in a mixed solvent of 9 ml of chloroform and 1 ml of HFIP (total amount of 20 ml) and mixed together in an L/D ratio of 50/50. After 20 minutes of mixing and agitation, the obtained solution was poured into a glass Petri dish and left to stand at room temperature and normal pressure for 15 hours. Thereafter, it was continuously dried in a vacuum oven at room temperature for 2 hours, at 60° C. for 2 hours and at 80° C. for 6 hours.

The properties of this polylactic acid stereocomplex polymer were evaluated in the same manner as in Example 14. These results are shown in Table 6.

Example 16

The procedure of Example 14 was repeated except that the polylactic acid block copolymer A9 and the polylactic acid block copolymer B9 were mixed together in a ratio of 50:50 to obtain polylactic acid stereocomplex polymer. The properties of this polylactic acid stereocomplex polymer were evaluated in the same manner as in Example 14. These results are shown in Table 6.

Example 17

The procedure of Example 15 was repeated except that the polylactic acid block copolymer B9 and the polylactic acid block copolymer A9 were mixed together in a ratio of 50:50 to obtain polylactic acid stereocomplex polymer. The properties of this stereocomplex polylactic acid were evaluated in the same manner as in Example 15. These results are shown in Table 6.

Example 18

The polylactic acid block copolymer B9 and the polylactic acid block copolymer A9 were added to a flask in a ratio of 50:50, the inside of the system was substituted by nitrogen, the mixture was heated to 175 to 220° C. and melt blended together at 220° C. for 3 minutes. The properties of the obtained copolymer were evaluated in the same manner as in Example 15. These results are shown in Table 6.

Comparative Example 6

The procedure of Example 14 was repeated except that the following poly-L-lactic acid (PLLA) and poly-D-lactic acid (PDLA) were used and mixed together in a ratio of 50:50 to obtain a film. The properties of this film were evaluated in the same manner as in Example 14. These results are shown in Table 6.

PLLA: weight average molecular weight of 110,000, polydispersion degree (Mw/Mn) of 2.66, melting point (Tm) of 165° C.

PDLA: weight average molecular weight of 100,000, polydispersion degree (Mw/Mn) of 2.49, melting point (Tm) of 166° C.

Comparative Example 7

The procedure of Example 15 was repeated except that poly-L-lactic acid (PLLA) and poly-D-lactic acid (PDLA) in Comparative Example 6 were used and mixed together in a ratio of 50:50 to obtain a film. The properties of this film were evaluated in the same manner as in Example 15. These results are shown in Table 6.

expected to be used for foods, packages and engineering purposes such as automobiles and home electric appliances.

The invention claimed is:

1. A process for manufacturing polylactic acid having a melting point of 195° C. or higher, consisting essentially of the steps of:
(1) making a crystalline polymer (A) which is composed of 90 to 100 mol % of an L-lactic acid unit and 0 to 10 mol % of a D-lactic acid unit and/or a comonomer component unit other than lactic acid and has a melting point of 140 to 180° C. and a weight average molecular weight of 100,000 to 500,000 and a crystalline polymer (B-1) which is composed of 90 to 99 mol % of a D-lactic acid unit and 1 to 10 mol % of an L-lactic acid unit and/or a comonomer component unit other than lactic acid and has a melting point of 140 to 170° C. and a weight average molecular weight of 100,000 to 500,000 coexistent in an (A)/(B-1) weight ratio of 10/90 to 90/10, and heating once at 245 to 300° C., thereby obtaining the polylactic acid having a melting point of 195° C. or higher; or
(2) making a crystalline polymer (B) which is composed of 90 to 100 mol % of a D-lactic acid unit and 0 to 10 mol % of an L-lactic acid unit and/or a comonomer component unit other than lactic acid and has a melting point of

TABLE 5

| | Polylactic acid block copolymer | L/D ratio | | Mw | Mw/Mn | Tc °C. | Tmh °C. | Tms °C. | ΔHmh J/g | ΔHms J/g | $R_{200\ or\ higher}$ (%) | $\chi^c$ (total) (%) | $\chi^c$ (SC) (%) | v |
| --- | --- | --- | --- | --- | --- | --- | --- | --- | --- | --- | --- | --- | --- | --- |
| | | L | D | | | | | | | | | | | |
| Production Example 19 | A8 | 80 | 20 | 100000 | 2.63 | 100 | 176 | 211 | 41.1 | 16.6 | 28.6 | 32 | 36 | 21.5 |
| Production Example 21 | A9 | 90 | 10 | 119000 | 2.73 | 117 | 178 | 209 | 58.5 | 17.7 | 23.2 | 41 | 30 | 28.2 |
| Production Example 20 | B8 | 20 | 80 | 87000 | 2.36 | 106 | 167 | 210 | 40.9 | 33 | 44.7 | 43 | 54 | 19.8 |
| Production Example 22 | B9 | 10 | 90 | 93000 | 2.26 | 119 | 171 | 201 | 48.5 | 11.5 | 19.2 | 32 | 25 | 12.7 |

TABLE 6

| | Raw material polylactic acid block copolymers | | A/B charge ratio | SC | | Tc °C. | Tmh °C. | Tms °C. | ΔHmh J/g | ΔHms J/g | $R_{200\ or\ higher}$ (%) | $\chi^c$ (total) (%) | $\chi^c$ (SC) (%) | v |
| --- | --- | --- | --- | --- | --- | --- | --- | --- | --- | --- | --- | --- | --- | --- |
| | A | B | | Mw | Mw/Mn | | | | | | | | | |
| Ex. 14 | A8 | B8 | 50/50 | 89000 | 2.35 | 97 | 165 | 205 | 8.5 | 37.2 | 81.4 | 30 | 86 | 16.0 |
| Ex. 16 | A9 | B9 | 50/50 | 106000 | 2.41 | 105 | 167 | 207 | 7.3 | 29.5 | 80.2 | 24 | 85 | 18.8 |
| C. Ex. 6 | PLLA | PDLA | 50/50 | 107000 | 2.53 | 106 | 167 | 207 | 24.6 | 19.6 | 44.3 | 26 | 53 | 48.8 |
| Ex. 15 | A8 | B8 | 50/50 | 81000 | 2.07 | 99 | 168 | 212 | 0.8 | 49.8 | 98.4 | 35 | 99 | 22.3 |
| Ex. 17 | A9 | B9 | 50/50 | 86000 | 2.04 | 102 | 170 | 213 | 2.6 | 57.2 | 95.7 | 42 | 97 | 24.2 |
| Ex. 18 | A9 | B9 | 50/50 | 85000 | 1.90 | 103 | 170 | 212 | 2.3 | 47.0 | 95.3 | 34 | 97 | 18.3 |
| C. Ex. 7 | PLLA | PDLA | 50/50 | 85000 | 2.17 | 113 | 169 | 214 | 31.3 | 29.4 | 48.4 | 36 | 57 | 45.3 |

Ex.: Example
C. Ex.: Comparative Example

INDUSTRIAL FEASIBILITY

According to the present invention, there is provided polylactic acid having excellent mechanical strength, heat resistance and heat stability as well as excellent transparency, safety and biodegradability. Therefore, the polylactic acid is 140 to 180° C. and a weight average molecular weight of 100,000 to 500,000 and a crystalline polymer (A-1) which is composed of 90 to 99 mol % of an L-lactic acid unit and 1 to 10 mol % of a D-lactic acid unit and/or a comonomer component unit other than lactic acid and has a melting point of 140 to 170° C. and a weight average molecular weight of 100,000 to 500,000 coexistent in an (A-1)/(B) weight ratio of 10/90 to 90/10, and heating once at 245 to 300° C., thereby obtaining the polylactic acid having a melting point of 195° C. or higher.

2. The process according to claim 1, wherein the crystalline polymer (A) is composed of 90 to 99 mol % of an L-lactic acid unit and 1 to 10 mol % of a D-lactic acid unit and/or a comonomer component unit other than lactic acid and has a melting point of 140 to 170° C. and a weight average molecular weight of 100,000 to 500,000, and the crystalline polymer (A) and the crystalline polymer (B-1) are made coexistent in an (A)/(B-1) weight ratio of 90/10 to 10/90 and heated at 270 to 300° C.

3. The process according to claim 1, wherein a crystalline polymer (A-2) which is composed of more than 99 mol % and 100 mol % or less of an L-lactic acid unit and 0 mol % or more and less than 1 mol % of a D-lactic acid unit and/or a comonomer component unit other than lactic acid and has a melting point of 160 to 180° C. and a weight average molecular weight of 100,000 to 500,000 and the crystalline polymer (B-1) are made coexistent in an (A-2)/(B-1) weight ratio of 10/90 to 90/10 and heated at 245 to 300° C.

4. The process according to claim 1, wherein a crystalline polymer (B-2) which is composed of more than 99 mol % and 100 mol % or less of a D-lactic acid unit and 0 mol % or more and less than 1 mol % of an L-lactic acid unit and/or a comonomer component unit other than lactic acid and has a melting point of 160 to 180° C. and a weight average molecular weight of 100,000 to 500,000 and the crystalline polymer (A-1) are made coexistent in an (A-1)/(B-2) weight ratio of 10/90 to 90/10 and heated at 245 to 300° C.

5. The process according to claim 1, wherein the crystalline polymers are mixed together in the presence or absence of a solvent and heated.

6. The process according to claim 1, wherein the crystalline polymers are in the form of a powder or chip.

* * * * *